United States Patent
Laukien et al.

(10) Patent No.: US 10,579,929 B2
(45) Date of Patent: Mar. 3, 2020

(54) PROCESSING TIME-VARYING DATA STREAMS USING SPARSE PREDICTIVE HIERARCHIES

(71) Applicant: Ogma Intelligent Systems Corp., Jupiter, FL (US)

(72) Inventors: Eric Laukien, Jupiter, FL (US); Fergal Byrne, Dundrum (IE); Richard Crowder, Mid Glamorgan (GB)

(73) Assignee: OGMA INTELLIGENT SYSTEMS CORP., Jupiter, FL (US)

( * ) Notice: Subject to any disclaimer, the term of this patent is extended or adjusted under 35 U.S.C. 154(b) by 0 days.

(21) Appl. No.: 16/304,396

(22) PCT Filed: May 26, 2017

(86) PCT No.: PCT/US2017/034867
§ 371 (c)(1),
(2) Date: Nov. 26, 2018

(87) PCT Pub. No.: WO2017/205850
PCT Pub. Date: Nov. 30, 2017

(65) Prior Publication Data
US 2019/0294980 A1  Sep. 26, 2019

(51) Int. Cl.
*G06N 5/04* (2006.01)
*G06N 20/00* (2019.01)
*G06N 3/04* (2006.01)
*H04N 19/50* (2014.01)

(52) U.S. Cl.
CPC ........ *G06N 5/04* (2013.01); *G06N 3/04* (2013.01); *G06N 20/00* (2019.01); *H04N 19/50* (2014.11)

(58) Field of Classification Search
None
See application file for complete search history.

(56) References Cited

U.S. PATENT DOCUMENTS

2018/0039239 A1*  2/2018  Burchard ............. G06N 3/0445

OTHER PUBLICATIONS

Laukien et al., Feynman Machine: The Universal Dynamical Systems Computer, Sep. 13, 2016, Cornell Univ. arXiv, URL: https://arxiv.org/abs/1609.03971 (Year: 2016).*

(Continued)

*Primary Examiner* — Howard Williams
(74) *Attorney, Agent, or Firm* — BainwoodHuang

(57) ABSTRACT

A technique for processing streams of time-varying data provides first through Nth processing stages, each processing stage having a respective encoder and a respective decoder. The encoder of each processing stage receives successive values of time-varying input data and generates therefrom encoded output data. Each encoder provides its encoded output data as input to its respective decoder, which generates a prediction of a next value of the time-varying input data that the encoder will receive. Each encoded output is based upon both (1) a current input value and (2) one or more previous input values, such that encodings are based at least in part on history. Encoders are coupled output-to-input, with the input of the first encoder receiving an overall processing input. Decoders are likewise coupled output-to-input, with each decoder providing feedback to the previous decoder and the first decoder providing an overall processing output.

33 Claims, 16 Drawing Sheets

(56) References Cited

OTHER PUBLICATIONS

Rasmus et al., Semi-Supervised Learning with Ladder Networks, Cornell Univ. Nov. 2015, URL: http://arxiv.org/abs/1507.02672 (Year: 2015).*

Pezeshki et al., Deconstructing the Ladder Network Architecture, May 2016, Cornell Univ. arXiv; URL: https://arxiv.org/abs/1511.06430v4 (Year: 2016).*

* cited by examiner

PROCESSING TIME-VARYING DATA STREAMS USING SPARSE PREDICTIVE HIERARCHIES

CROSS-REFERENCE TO RELATED APPLICATIONS

This applications claims the benefit of the filing date of the following provisional patent applications, the contents and teachings of which are incorporated herein by reference in their entirety: U.S. Application No. 62/341,790, filed May 26, 2016; U.S. Application No. 62/382,992, filed Sep. 2, 2016, U.S. Application No. 62/424,226, filed Nov. 18, 2016, and U.S. Application No. 62/464,090, filed Feb. 27, 2017.

FIELD OF THE INVENTION

The present invention relates generally to computerized technology for processing temporal sequences of data, and, more particularly, to computerized techniques for efficiently processing and predicting such sequences.

BACKGROUND OF THE INVENTION

Many applications in industry, consumer devices and healthcare involve the processing and transformation of raw information signals into useful or improved outputs which can be interpreted by users or passed on for further analysis, processing and decision making. These signals are often both high-dimensional and high-velocity, for example vehicle camera video, Magnetoencephalograph (MEG), and sensors embedded in large machines.

Such applications traditionally require the manufacturer to develop complex hardware and software systems in order to process the raw inputs from sensors and generate outputs which are valuable to the user. This incurs significant research, development, testing and maintenance costs, which adds to the expense and running costs of the system. This is exacerbated by the need to largely rewrite or re-engineer such systems when new components are added, the sensor technology changes, or the system is repurposed for a new application domain.

Traditional systems of this kind also usually require the employment of experts at every stage, from the identifying of requirements, to vendor selection and purchasing, installation, integration, maintenance and most importantly operation. Such experts may be rare and costly, and are diverted from other productive tasks in an organisation. All this complication and cost reduces the scale at which new analytical and diagnostic systems can be adopted, and thus significantly reduces the benefits available to industry, consumers and health practitioners of advances in sensor technology.

In answer to this, some progress has been made by using machine learning to replace or augment traditional hand-engineered and hand-coded componentry in such systems. Unfortunately, most such machine learning methods are ill-suited to the particular conditions which exist in the domains under discussion, for a variety of reasons.

SUMMARY OF THE INVENTION

First, such systems themselves require high expertise in both the configuration of the learning system and its application to the type of data of interest. Such expertise may be unavailable or in short supply, and in any case will be expensive.

Second, most machine learning systems are trained in a supervised manner, which requires a very large amount of previously prepared labelled data which acts as a target. Producing labelled data is often an expensive process which itself requires significant expertise. When the training is complete, such systems may have to work on data which differs significantly from that found in the training set, and indeed may change from time to time, from machine to machine or from patient to patient.

Third, most machine learning methods either ignore temporal structure completely, or else treat it only as a dimension of finite extent. Many processes in industry, medicine and the outside world are very complex dynamical systems, where correlation-based strategies might not be appropriate, and so the ability to model the data temporally and dynamically is of crucial importance.

Finally, most such methods often have very high computational costs in terms of processor speed, power consumption, and memory, and often need high-end Graphical Processing Units (GPUs), or even clusters of them, to perform training and/or inference. Such systems may be infeasible or impossible in many applications, and in any case will add significantly to their purchase, installation and running costs.

In contrast with prior approaches, an improved technique for processing streams of time-varying data includes providing first through N-th processing stages, each processing stage having a respective encoder and a respective decoder. The encoder of each processing stage receives successive values of time-varying input data and generates therefrom encoded output data. Each encoder provides its encoded output data as input to its respective decoder, which generates a prediction of a next value of the time-varying input data that the encoder will receive. Each encoded output is based upon both (1) a current input value and (2) one or more previous input values, such that encodings are based at least in part on history. Encoders are coupled output-to-input, with the input of the first encoder receiving an overall processing input. Decoders are likewise coupled output-to-input, with each decoder providing feedback to the previous decoder and the first decoder providing an overall processing output.

Advantageously, example embodiments provide a new kind of learning that self-configures and adjusts automatically to its data and task. Such embodiments may require little or no expertise to configure, train, or operate effectively, can handle large quantities of high-dimensional data streams on readily available platforms and hardware, automatically tailor themselves to the particular environments and/or continuously learn so as to adjust to changed circumstances. Also, certain may require no pretraining, but may benefit from both supervision feedback and reinforcement signals when available. Further, examples may operate in a scalable, modular fashion allowing for hierarchy and networks of learning modules.

Certain embodiments also address several issues and provide several useful improvements in machine learning and its applications, for example that of handling context in sequential predictions, that of catastrophic interference, that of limited-horizon working memory, and/or that of providing efficient sparse coding, all in the face of potentially high-dimensional, high-velocity input data flows.

When constructed according to the details described herein, embodiments hereof may concentrate efficient local transformation and learning within modules and/or allow sparse, low-bandwidth signals between modules to be used to coordinate the cooperation of modules at multiple spatial and temporal scales.

Some embodiments are directed to an apparatus for processing streams of time-varying data. The apparatus includes first through N-th processing stages, each ith processing stage (i=1 to N) of the first through N-th processing stages including an encoder and a respective decoder. The encoder of each i-th processing stage has an input configured to receive, as a sequence of input values, a respective stream of time-varying data and an output configured to produce, as a sequence of encoded values, a respective encoded stream of time-varying data. Each encoded value is based upon both (1) a current input value of the stream of time-varying data received by that encoder and (2) a set of previous input values of the stream of time-varying data received by that encoder. The output of the encoder of each i-th processing stage except the N-th processing stage is coupled to the input of the encoder of the (i+1)-th processor stage. The input of the encoder of the first processing stage provides an input of the apparatus. In addition, the decoder of each i-th processing stage has an input coupled to the output of the respective encoder and an output configured to provide a prediction of a next input value that will be received at the input of the respective encoder. The output of the decoder of each i-th processing stage except the first processing stage is configured to provide the respective prediction as feedback to the decoder of the (i−1)-th processing stage, and the output of the decoder of the first processing stage provides an output of the apparatus.

In some arrangements, each of the first through N-th processing stages is coupled to a timing reference. The timing reference is configured to produce a sequence of time steps. The encoders in the first through N-th processing stages are configured to generate respective encoded values at their respective outputs in order from first through N-th during a current time step. The decoders in the first through N-th processing stages are configured to generate respective predictions at their respective outputs in reverse order from N-th to first during the current time step. The prediction from the decoder of the first processing stage is configured to predict a next input value of the time-varying data that will be received at the input of the encoder of the first processing stage during a next time step.

In some arrangements, each of the decoders in the first through N-th processing stages is configured to generate the respective prediction during the current time step but after the respective encoder has produced a respective encoded value of encoded the stream of time-varying data during the current time step.

In some arrangements, the apparatus is configured to generate an output value at the output of the apparatus from an input value received at the input of the apparatus by way of a single processing path that starts at the encoder of the first processing stage and proceeds, in a single direction and without reversal, to the encoder of the N-th processing stage, to the decoder of the Nth processing stage, and to the decoder of the first processing stage.

In some arrangements, the apparatus is configured to produce a new output value at the output of the apparatus, based on a new input value received at the input of the apparatus, during each of multiple successive time steps by processing each new input value received at the input of the apparatus via the single processing path to generate the respective output value of the apparatus. Each new output value produced at the output of the apparatus during each time step provides a prediction of a new input value that will be received at the input of the apparatus during a respective next time step.

In some arrangements, each i-th processing stage includes multiple weights and is configured to adjust at least some of its weights in response to detecting differences between (i) the output of the decoder in the i-th processing stage during a previous time step which predicted an input to the encoder in the i-th processing stage during the current time step and (ii) an input to the encoder in the i-th processing stage during the current time step.

In some arrangements, each encoder in a set of the processing stages includes: a feedforward unit configured to generate a stimulus vector from the respective stream of time-varying data received at the input of the encoder; an activation updater configured to generate an activation vector by updating activations using the stimulus vector; a non-linear selector configured to produce a set of sparse activations by selecting a subset of elements from the activation vector; and a state updater configured to produce, based on the set of sparse activations, the respective encoded stream of time-varying data at the output of the encoder.

In some arrangements, the non-linear selector in the encoder of at least one of the set of processing stages is further configured to render the activation vector as a set of chunks, and that non-linear selector is further configured to select the subset of elements by selecting only a single element from each of the set of chunks.

In some arrangements, an encoder is configured to provide at its output a signal in which each element that is not based on one of the selected subset of elements is represented as a zero.

In some arrangements, an encoder is further configured to provide a one in the signal at its output for each element that is based on one of the selected subset of elements.

In some arrangements, output from any of the first through N-th processing stages is coupled to other electronic circuitry to affect operation of the other electronic circuitry.

In some arrangements, the feedforward unit of the respective encoder is configured to manage multiple feedforward weights, and the respective encoder is configured to update at least one of the feedforward weights in response to a detection of a difference between the input of the respective encoder during the current time step and an output of the respective decoder during a previous time step.

In some arrangements, the N-th processing stage is configured to generate new outputs of its encoder at a first frequency, the first processing stage is configured to generate new outputs of its encoder at a second frequency, and the first frequency is less than the second frequency.

In some arrangements, at least one i-th processing stage is configured to generate new outputs of its encoder at a lower frequency than that of the respective (i−1)-th processing stage.

In some arrangements, one or more of the first through N-th processing stages further includes a respective predictor coupled in series between the output of the respective encoder and the input of the respective decoder, the predictor of each i-th processing stage of the one or more processing stages also coupled in series between the output of the decoder in the (i+1)-th processing stage and the decoder of the i-th processing stage and configured to provide a corrective supplementation of the output of the respective encoder using feedback.

In some arrangements, a first particular one of the first through N-th processing stages is disposed at a first physical location, a second particular one of the first through N-th processing stages is disposed at a second physical location, and the first and second particular ones of the first through N-th processing stages are connected to each other over a computer network.

Other embodiments are directed to a method for processing streams of time-varying data. The method includes providing first through N-th processing stages, each ith processing stage (i=1 to N) of the first through N-th processing stages including an encoder and a respective decoder. The method further includes, by the encoder in each ith processing stage, receiving, by an input of the encoder, a respective stream of time-varying data as a sequence of input values, and providing, by an output of the encoder, a respective encoded stream of time-varying data as a sequence of encoded values, the encoder generating each encoded value based upon both (1) a current input value of the stream of time-varying data received by that encoder and (2) a set of previous input values of the stream of time-varying data received by that encoder, the encoder of each ith processing stage except the N-th processing stage providing its encoded values to the encoder of the (i+1)-th processor stage, the input of the encoder of the first processing stage receiving an overall processing input. The method still further includes, by the decoder of each i-th processing stage, receiving, by an input of the decoder, the sequence of encoded values generated by the respective encoder, and generating, by the decoder, a sequence of predictions of each next input value that will be received by the input of the respective encoder, the decoder of each ith processing stage except the first processing stage providing the respective predictions as feedback to the decoder of the (i−1)-th processing stage, the decoder of the first processing stage providing an overall processing output.

In some arrangements, the method further includes generating, by a timing reference, a sequence of time steps, and providing the sequence of time steps to each of the first through N-th processing stages. Generating the encoded value by each of the encoders in the first through N-th processing stages is performed in order from first through N-th processing stages during a current time step. Generating a prediction by each of the decoders in the first through N-th processing stages is performed in reverse order from N-th to first during the current time step. The prediction from the decoder of the first processing stage is configured to predict a next input value of the time-varying data that will be received at the input of the encoder of the first processing stage during a next time step.

In some arrangements, generating the respective prediction by each of the decoders in the first through N-th processing stages is performed during the current time step but after the respective encoder has generated a respective encoded value during the current time step.

In some arrangements, the method further includes generating an output value at the overall processing output from an input value received at the overall processing input by way of a single processing path that starts at the encoder of the first processing stage and proceeds, in a single direction and without reversal, to the encoder of the N-th processing stage, to the decoder of the N-th processing stage, and to the decoder of the first processing stage.

In some arrangements, the method further includes producing a new output value at the overall processing output, based on a new input value received at the overall processing input, during each of multiple successive time steps by processing each new input value received at the overall processing input via the single processing path to generate the respective new output value at the overall processing output. Each new output value produced at the overall processing output during each time step provides a prediction of a new input value that will be received at the overall processing input during a respective next time step.

Still other embodiments are directed to a computer program product including a set of non-transitory, computer-readable media having instructions which, when executed by control circuitry of a computerized apparatus, cause the control circuitry to perform a method for processing streams of time-varying data. The method includes providing first through N-th processing stages, each ith processing stage (i=1 to N) of the first through N-th processing stages including an encoder and a respective decoder. The method further includes, by the encoder in each ith processing stage, receiving, by an input of the encoder, a respective stream of time-varying data as a sequence of input values, and providing, by an output of the encoder, a respective encoded stream of time-varying data as a sequence of encoded values. The encoder generates each encoded value based upon both (1) a current input value of the stream of time-varying data received by that encoder and (2) a set of previous input values of the stream of time-varying data received by that encoder. The encoder of each i-th processing stage except the N-th processing stage provides its encoded values to the encoder of the (i+1)-th processor stage, and the input of the encoder of the first processing stage receives an overall processing input. The method still further includes, by the decoder of each i-th processing stage, receiving, by an input of the decoder, the sequence of encoded values generated by the respective encoder, and generating, by the decoder, a sequence of predictions of each next input value that will be received by the input of the respective encoder, the decoder of each i-th processing stage except the first processing stage providing the respective prediction as feedback to the decoder of the (i−1)-th processing stage. The decoder of the first processing stage provides an overall processing output.

In some arrangements, each i-th processing stage includes multiple weights, and the method further includes the i-th processing stage adjusting at least some of its weights in response to detecting a difference between (i) a prediction of the decoder in the i-th processing stage in a previous time step which predicted an input value to the encoder in the i-th processing stage in the current time step and (ii) an input value to the encoder in the i-th processing stage in the current time step.

In some arrangements, the method further includes, by the encoder in at least one of the processing stages, generating a stimulus vector from the respective stream of time-varying data received at the input of the encoder, generating an activation vector by updating activations using the stimulus vector, producing a set of sparse activations by selecting a subset of elements from the activation vector, and producing, based on the set of sparse activations, the respective encoded stream of time-varying data at the output of the encoder.

In some arrangements, the method further includes rendering the activation vector as a set of chunks and selecting, as the subset of elements, only a single element from each of the set of chunks.

In some arrangements, the method further includes the encoder outputting a signal in which each element that is not based on one of the selected subset of elements is represented as a zero.

In some arrangements, the method further includes the encoder outputting a one in the signal for each element that is based on one of the selected subset of elements.

In some arrangements, the method further includes managing, by the encoder, multiple feedforward weights, and updating at least one of the feedforward weights in response to detecting of a difference between a current input of the encoder and a previous output of the respective decoder which predicted that current input.

In some arrangements, the method further includes generating, by the N-th processing stage, new outputs of its encoder at a first frequency, and generating, by the first processing stage, new outputs of its encoder at a second frequency, wherein the first frequency is less than the second frequency.

In some arrangements, the method further includes generating, by at least one i-th processing stage (i=2 to N), new outputs of its respective encoder at a lower frequency than that of the (i−1)-th processing stage.

In some arrangements, one or more of the first through N-th processing stages further includes a respective predictor coupled in series between the output of the respective encoder and the input of the respective decoder, the predictor of each i-th processing stage of the one or more processing stages also coupled in series between the output of the decoder in the (i+1)-th processing stage and the decoder of the i-th processing stage, and the method further includes the predictor of each i-th processing stage providing a corrective supplementation of the output of the respective encoder using feedback.

In some arrangements, each i-th processing stage includes multiple weights and the method further includes receiving no initial values of the weights in each i-th processing stage prior to operating the multiple processing stages.

In some arrangements, each i-th processing stage includes multiple weights and the method further includes establishing predetermined initial values of the weights in each i-th processing stage prior to operating the multiple processing stages.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE DRAWINGS

For a more complete understanding of the invention, reference is made to the following description and accompanying drawings, in which.

DETAILED DESCRIPTION OF EMBODIMENTS

Figure 1:
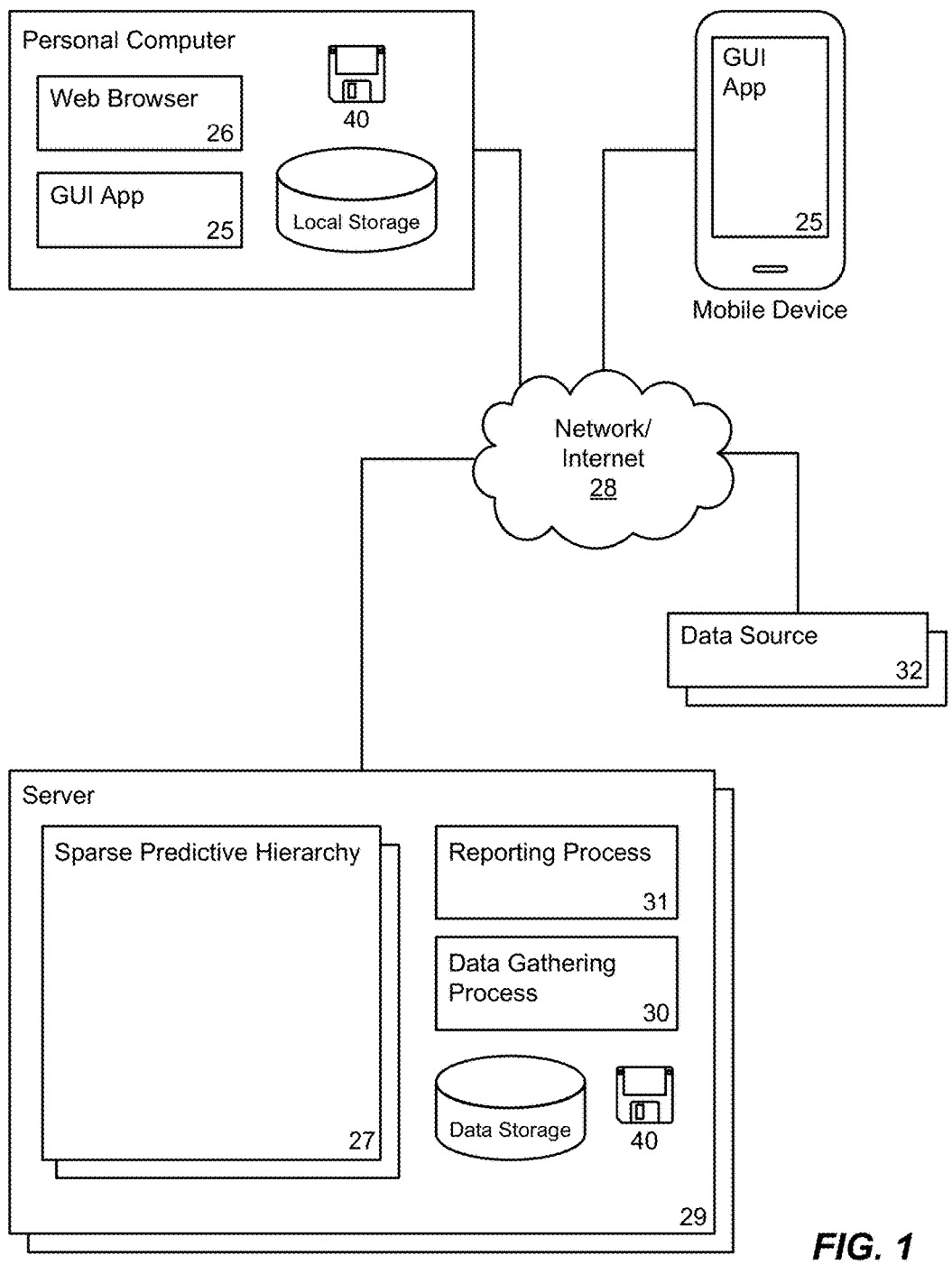
FIG. 1 is a block diagram of an example network arrangement in which embodiments of the invention can be practiced.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable executable instructions that may be stored or otherwise held by such computer readable media.

Overview of Particular Features

The following describes in detail the construction of appropriate networks, the structure of several module designs and the transformations they perform, the processes involving the signalling between modules, and the steps involved in learning in the modules.

In the following, a "frame" of data is the term used for any amount of data (not limited to image frames) which is presented to the system at any given moment, and a "stream" or "flow" or "sequence" or "signal" of data is a series of successive frames of data which are each recorded or received at the same time (or close together in time), or stored together in a storage medium. For example, a video camera may produce a sequence of image frames, 30 per second, and such a sequence may be stored in a computer file or on a digital tape.

An "encoder" is a piece of componentry which transforms each frame of data in one form into another form, possibly in combination with other frames from the same stream, and also with other data. The frame of data produced by an encoder is usually called the "encoding" of the input frame or frames.

Conversely, a "decoder" is a piece of componentry which transforms a frame of data in the language or form of an encoding back into a form similar to that expected as input to an encoder. For example, an encoder for video might take frames of pixel color values and transform them into a compressed form for storage and transmission, and a decoder might later take such a compressed file and decode it into a form suitable for display.

A "sparse encoding" is a frame of numeric data where most values are zero and only some are non-zero. A "binary sparse encoding" is one where the non-zero values are all equal to one.

Several terms appear in the following which are used conventionally in machine learning and neural networks, for example "hidden" and "visible" layers and units, "feedforward", "feedback" and "recurrent", "activation", "weight" etc. These terms will be recognised by those skilled in the art to have their usual meanings.

As found conventionally in machine learning and neural networks, collections or arrays of scalar values may be referred to herein as "layers" of "units". When a component (encoder or decoder) has several layers of the same dimensions, each vector of scalar values in the same position in the several layers is referred to as a "cell."

Predictive Hierarchy

An innovation of the invention, the "Predictive Hierarchy", is part of the componentry in the apparatus. The predictive hierarchy comprises a stack of "processing stages", each processing stage including a paired encoder and decoder. The processing stages form autoencoder-like "layers," in which feedforward signals are fed up the hierarchy in a chain of encoder modules, feedback and predictive signals are passed down the hierarchy via a chain of decoders, and recurrent connections across and between layers allow for learning and prediction assistance at both the local and network levels.

The succession of steps for encoding and prediction in a Sparse Predictive Hierarchy during a single timestep t are described as follows: receive input at timestep t from the time-varying stream of data provided to the apparatus via the sensor and action input, generate encoding 1 in the first processing stage using this input (and previous values), generate encoding 2 in the second processing stage using the encoding from the first processing stage, and so on until the $N^{th}$ processing stage will generate encoding N. Using the resulting encoding, the decoder of the $N^{th}$ processing stage will generate prediction N, which predicts the input received at the encoder of the $N^{th}$ processing stage at a next timestep. This prediction is sent to the decoder of the $(N-1)^{th}$ processing stage, where it is combined with the already-produced encoding for time t output by the corresponding encoder of the $(N-1)^{th}$ processing stage. The succession is continued at each $i^{th}$ processing stage, where a feedback prediction from the decoder of the $(i+1)^{th}$ processing stage is combined with the already-produced encoding for time t output by the corresponding encoder of the $i^{th}$ processing stage, and decoded to produce a prediction of the same encoder's input at a next time step. Finally, the decoder of the second processing stage will generate prediction 2 and provide this prediction to the decoder of the first processing stage, which will generate prediction 1. This prediction will be used to predict the input at next timestep of the Sparse Predictive Hierarchy at a next timestep.

Each predictive hierarchy processing stage, by virtue of its recurrent and lateral connections, is capable of locally and independently processing its inputs and generating both spatiotemporal encodings and predictions of future inputs, thus learning a spatiotemporal model of its (feedforward and feedback) sensorimotor world.

Simply by stacking processing stages in the predictive hierarchy, the hierarchical spatiotemporal structure in real world data is modelled in the structure of the network, so learning and prediction is enhanced in each layer.

Due to the self-contained processing power of each predictive hierarchy processing stage and the small size of sparse encodings, the predictive hierarchy network can be very easily distributed across heterogeneous computing devices connected by low-bandwidth links. For example, low-power devices running the lower processing stages of the hierarchy may be dynamically augmented by adding higher processing stages running on more powerful cloud infrastructure. This design is robust to network outages, as all connected processing stages at the bottom of the hierarchy will continue to function in a graceful degradation.

Due to its modular nature, involving a uniform Application Programming Interface (API) for encoders, decoders, and the communication between them, the implementer of a predictive hierarchy system can replace any particular processing stage described herein with variants or complete replacements conforming to their needs.

An example embodiment of replacing modules is described herein, where a continuous high-dimensional input (e.g. video) is encoded to sparse binary form in the first processing stage by an iterative solver module, and the upper layers consist of encoders based on a spike propagating ("SpikeProp") variation of the Delay Encoder described below.

The effect of the lateral connections between encoder and decoder may also be varied by the implementer of a predictive hierarchy system. For example we describe two embodiments of what are denoted Routed Predictive Hierarchies, in which the encoders control the activity of feedforward neural networks in the first, and swarms of reinforcement learning agents in the second. It will be clear to those skilled in the art that the improvements provided by the predictive hierarchy may easily be thus incorporated into existing machine learning or control systems.

Due to its uniform API, the predictive hierarchy itself is a component which may be used in various ways in different embodiments, not only as detailed herein, but in any way which is sufficiently clear to those skilled in the art. For example, we detail embodiments which predict the next frame of the input data stream, embodiments which remove added noise from a stream of data, and embodiments which use reinforcement learning to achieve a goal.

The present invention is designed to be easily re-implemented in any modern programming language and on all kinds of hardware, including single-core or multi-core Central Processing Unit (CPU), Graphical Processing Unit (GPU), Field Programmable Gate Array (FPGA) etc. In addition, example embodiments are described in which an entire system runs on a single device, in which a system is distributed across multiple devices, in which a network of systems is formed, and in which a system can be dynamically augmented with extra processing stages.

The encoders and decoders in the predictive hierarchy may, furthermore, be implemented using hardware circuitry, both traditional analog and digital, discrete and integrated, and also using non-traditional circuitry such as neuromorphic and memcomputing circuitry.

Due to the uniform structure of the internal learned model data, separate instances of the present invention may communicate their internal memory structures using a standard buffer library. For example, this allows pretraining of a system using high-performance server clusters for eventual deployment on a low-power, mobile or embedded device where compute power or data transmission for training is infeasible. It also allows devices to perform backup and recovery of learned models in case of failure or error. Further, it allows redeployment of systems from a single device to a cluster, from a cluster of one size to one of another, and so on, as the operator requires.

An embodiment of the present invention is capable of immediate online learning and predictive performance without pretraining or supervision of any kind, the performance improving as it continues to learn the data. In addition, the system may, depending on its settings, continuously adapt to any trending changes in the characteristics of the data. Further, we detail embodiments which use the system in a fully- and weakly- or semi-supervised regime, as well as reinforcement learning.

One class of embodiments of the present invention comprises one or more server devices (which e.g. include CPU processor circuitry, computer memory, persistent storage, GPU and/or FPGA circuitry etc), loading and executing a stored program code which implements the componentry described herein, and connected to a device which is a source of temporal data signals (e.g. vehicle cameras, Magnetoencephalograph (MEG) sensors), or to storage which contains a recording of said data. The input data is used by the apparatus to automatically learn about the spatial and temporal structure of a problem, to form predictions and detect anomalies in the data, and/or to remove noise or spurious artifacts from the data. The apparatus then provides the user with information relevant to a task which is derived from these predictions and anomalies. For example, a machine operator using the apparatus may receive warnings about the condition of the machine's functioning, and may use these to direct appropriate intervention.

In a typical example embodiment, each encoder module consists of an optional input transformer (usually a linear transformation), and a globally or locally connected weight matrix, which transforms the derived inputs into a stimulus layer.

The encoder module may in some embodiments combine its companion decoder's predictions (or their prediction errors) with its own inputs, either by merging or by concatenation, depending on the embodiment. In addition, feedback from higher layers may similarly be combined, either raw or with some preprocessing, with the feedforward stimulus as drawn from the weight matrix.

To incorporate temporal structure in the encoder representations, inputs, stimuli and activations may all be formed with respect to their own histories in various ways described herein, and the overall performance of each processing stage, as measured by prediction errors, may be used to guide the updates of the encoder and decoder weight matrices.

Delay Encoder

An innovation of the invention, the "Delay Encoder", is part of the componentry in the apparatus in some embodiments. Each delay encoder comprises an autoencoder-like two-layer architecture, containing a "visible" (input) layer and a "hidden" (output) layer. The hidden layer is connected to the input layer through a set of synapse-like weighted connections. Each connection contains two values: A weight, and an eligibility trace. These connections feed into the array of hidden layer "cells," which can be of a different dimension. Each cell contains four variables: the "stimulus," "activation," "trace," and (output) "state" Together these variables form a sort of time-keeping system. In addition to those time-keeping variables, each cell also has a homeostatic regulation variable (bias). Finally, each input also has an associated trace, which can simply be the cell trace if the input corresponds to a cell from another layer.

The delay encoder layer first computes the stimulus of the hidden cells using a matrix multiplication, or simply multiplying each input by its corresponding weight. This step is similar to the operation of standard feed-forward neural networks and autoencoders.

Having computed the stimulus, the encoder adds it to the current activation value of each cell, and subtracts the cell bias. This means that the activation either increases or decreases with each stimulus. Some embodiments may constrain the activations to only be positive.

Finally, the encoder sets the output cell states to 1 for the top K highest-activation cells, where K is the target sparsity level, while the rest of the output states are set to 0. Once a cell's state is 1 (which is referred to as a spike), its activation is reset to 0.

This example method of operation is a simplified version of standard spiking neurons, but with an important difference: Neurons only fire and reset their activations when they are part of the top K highest activations. This can be thought of as implementing a sort of neural stack, where the top K elements are popped from every simulation tick. This distinction allows cells to remain unaltered by the state of other cells until it is their 'turn' to fire, and cells cannot fire on their own, they must be higher than some percentage of the population of cells.

In a typical embodiment, a delay encoder learns using a novel spike-timing dependent plasticity (STDP) based learning rule. Each connection in the delay encoder computes a STDP function that indicates the preferred temporal direction the connection would like the corresponding cell to take. The STDP values of all connections are averaged together to get the total temporal direction the cell should move in order to maximize the number of inputs the cell is predicting. Using this direction vector, each cell can be updated to fire either sooner or later depending on the desired temporal direction. This is done by maintaining another set of per-connection traces, which accumulate inputs and are reset to 0 when the cell emits a spike. The final update to the connection weights is then a product of the desired temporal direction and the eligibility trace for a connection.

To make sure the system doesn't diverge, the encoder includes for each cell a homeostatic regulatory variable—its bias. As aforementioned, the bias is an additional value subtracted from the activation of a cell in each simulation tick. It is updated to make sure that the total stimulus of a cell is on average 0.

We assume that a decoder (which, in typical embodiments, is a simple linear combination of the hidden states of the encoder) provides predictions from each encoder by using the standard perceptron learning rule with a time delay. In some embodiments, this decoder solely provides predictions from the encoder hidden state, and can feed back in to the encoder (as when using the previously described STDP-based learning rule for the encoder). In other embodiments the connection is used to provide additional information to the delay encoder about decoder prediction errors.

A single delay encoder (paired with an appropriate decoder) can learn complex sequences on its own, but the complexity of the system can be reduced (improved) by adopting a hierarchical approach. The idea is to simply stack several delay encoders, where the input layer of one encoder is either the input to the whole system or the hidden layer (output) of a lower delay encoder. The decoders then go in the opposite direction, each generating a prediction of the next hidden state of its corresponding delay encoder using information from the paired encoder and higher-layer encoders or decoders.

In a typical embodiment, the activation phase of the system is separated into two phases to improve performance with respect to computational resources. One can first perform an upwards-pass that activates all delay encoders in order, and then a downwards-pass that activates all decoders in order while referencing the encoders. This avoids iterative solving for a dynamical system.

The STDP portion of the learning rule is assumed to be the standard temporal association STDP learning rule (excitatory STDP). However, it is vital for the delay encoder that these STDP values do not directly update the connection weights as in most literature, but rather that they are averaged (possibly with weighting) to determine the cell's temporal direction, where the direction then modulates a set of per-connection eligibility traces in order to update the connection weights.

Chunk Encoder

The "Chunk Encoder" is an improved piece of componentry which may be used as a replacement for other encoders in the Predictive Hierarchy as described elsewhere. The Chunk Encoder splits its output hidden state layer into small tiles called "chunks," which operate as small, semi-independent self-organising representers of the underlying input data. Each chunk chooses a winning cell by inhibition for each timestep, and the weights in the chunk's units are updated to try to follow the winner for the given input.

The Chunk Encoder improves on other encoder designs by further localising the transformations between visible and hidden activations, thus reducing the size of the matrices used. In addition, uniform, constant sparsity is imposed by the tiling of the layer, and the complexity of the inhibition step is reduced to finding the maximal activation in each chunk, rather than the more expensive operation of finding the top-k activations in the whole layer. Further, learning is simplified by using chunk-local rules, and applying the updates over smaller, chunk-local matrices. Finally, the representation of the encoding is compact and easily processed downstream, being a matrix of indices of chunk winners.

Time Division Feedback

"Time Division Feedback" is an improvement to the componentry of the Sparse and/or Routed Predictive Hierarchy as described herein, in which the effect of the decoder output of an upper processing stage/layer is to modify the signal fed from encoder to decoder in the lower processing stage, so as to share the learning-prediction burden of lower processing stages. Furthermore, the upper processing stages operate on successively longer timescales (alternatively at a lower frequency), so they more efficiently store context information which lower processing stages need not learn in full. Depending on the chosen mode of operation, the feedforward signal of the encoders to higher processing stages may be either simply a higher-level representation, or a prediction error signal, and in turn the feedback signal will either be corrective of that representation, or will compensate for the prediction errors, respectively.

In representation coding embodiments, each encoder passes upward a sparse (often binary) code which represents an encoded prediction of its own next feedforward input, as described elsewhere. Due to its finite capacity, the encoder's prediction will have some error for each timestep. In versions of the Sparse Predictive Hierarchy as described elsewhere, the decoder used a linear combination of the encoder output and the feedback from the higher processing stage to generate its prediction, but with Time Division Feedback it uses instead a single encoding which is produced by using the feedback signal to correct that of the encoder.

In predictive coding embodiments, each encoder computes its prediction error and passes this up instead of the full representative code. The higher processing stage now models the errors in the lower encoder and attempts to predict those errors for the next step. Thus, the difference between the actual and predicted encoder errors automatically represents the corrective signal which improves the encoder's prediction given the higher-level context knowledge in the higher processing stage.

In both classes of embodiments, a higher processing stage combines inputs over a small number (called the stride $n_s$) of input timesteps to produce a more slowly-varying encoding, a process known as "striding". This is achieved by maintaining a separate collection of connection parameters (usually in a weight matrix) for each of the $n_s$ inputs, and choosing the appropriate transformation for each substep of the input, and similarly for the "destrided" decoding of each feedback predictive encoding. The stride $n_s$ may vary depending on the layers, for simplicity we describe embodiments with a single value of $n_s$.

Since each processing stage's encoding changes only once every $n_s$ timesteps of its inputs, the prediction and learning burden is reduced exponentially with each step up in the hierarchy. This allows for highly efficient upper layers, so that a large number of processing stages can be used with low computational overhead. In the distributed embodiments described elsewhere, the communication overhead between nodes is similarly more efficient.

In addition to the Sparse Predictive Hierarchy Encoders described elsewhere in this document, the Time Division Feedback augmentation may also be applied to Encoders (and Decoders) constructed from traditional Artificial Neural Networks. This allows the use of widely-adopted and familiar toolkits and platforms, with the additional power and efficiency of Time Division Feedback.

In the following, the Sparse Predictive Hierarchy with Time Division Feedback is described. The hierarchy is described by augmenting the Sparse Predictive Hierarchy (of any variant described herein) with a Predictor module for each layer. The Predictor module is connected to the feedback signals from higher layers as well as the upward-passing Encoder signal, and delivers its corrected output to the Decoder module for the down-pass.

It will be clear to those skilled in the art that this augmentation may be applied generally to variants of the Sparse and/or Routed Predictive Hierarchy as described elsewhere in the instant application.

In the above described augmentation, the Predictor applies a corrective supplementation to the Encoder output by using the upper layer feedback signal. This is suitable in many embodiments described below, but it may be omitted in favour of the standard feedback path as described elsewhere, ie the Decoder receives a destrided feedback signal and an uncorrected encoder signal, and combines them using two weight matrices. In this class of embodiments, the advantage of the striding/destriding is preserved.

Electronic and Computer-Electronic Implementation

In addition to computer software-based embodiments described elsewhere in the instant application, the Sparse Predictive Hierarchy and its variants may be implemented (in part or in whole) in analog and/or digital electronic circuits (including those with photonic elements), whether discrete or in integrated circuit form, as can its interfaces with its inputs, outputs and controls. Furthermore, embodiments of the hierarchy may involve combinations of circuit-based and computer software-based modules, with appropriate signalling componentry.

In the following, a number of details are set forth to aid understanding of embodiments described herein. However, it will be understood by those of ordinary skill in the art that the embodiments described herein may be practiced without these specific details. In particular, those of ordinary skill in the art will understand that numerous circuits with appropriate properties may be used in place of those described herein.

In such hardware-based embodiments, some or all the transformation of signals by software described in the instant application is instead carried out by the circuitry, the storage of past information is instead carried out using elements with memory, feedback circuitry and/or delay loops, and the learning rules are replaced by controlled adjustment of circuit characteristics, and/or updating the contents of elements with memory.

In one class of embodiments, encoder and decoder modules are constructed using circuitry which includes memresistors, memcapacitors, and/or meminductors (whose physical circuit parameters may be altered by control signals), and/or circuitry which emulates such memcomputing elements using ordinary components (such as those involving delayed and/or adjusting feedback loops, switched feedback loops etc.). Such circuitry has two important characteristics.

Firstly, the internal states and outputs of such circuitry depend not only on the current inputs, but also on the history of those inputs. Secondly, the internal characteristics of the circuitry may be adjusted using control inputs.

In another class of embodiments, modules are constructed which include photonic delay circuitry, which also has storage and control capabilities.

Another class of embodiments includes modules which are implemented in neuromorphic circuitry, both spiking and non-spiking forms. In some embodiments, the transformations and learning are carried out by running software on many cores, while in others they are carried out by configuring the circuitry itself.

A further class of embodiments has modules which utilises analog or digital signal processing circuitry which has been configured and connected to carry out transformations of the signals equivalent to those specified in the computer software embodiments.

Another class of embodiments includes Field Programmable Gate Arrays and similar reprogrammable integrated circuits (both digital and analog), which are configured to transform signals and data appropriately for the Predictive Hierarchy.

Yet another class of embodiments uses Digital Differential Analyser circuitry, whether realised in an FPGA or in an application-specific integrated circuit (ASIC).

As those skilled in the art will appreciate, the use of hardware circuitry may be used as described here for any and all variants of the Sparse and/or Routed Predictive Hierarchy as described in the instant application.

DESCRIPTIONS WITH REFERENCE TO THE FIGURES

FIG. 1 shows an example embodiment in which the system comprises one or more server devices [29] (each including eg a CPU processor circuit, memory, storage, GPU, FPGA etc) connected via a network/Internet connection [28] to one or more client devices, which may for example be a personal computer [33] or mobile device, and also to one or more data sources [32] (ie componentry which transforms or stores a record of some information of interest). The server device(s) execute program instructions from the stored program code [40], such that one or more Sparse Predictive Hierarchy [27] structures are constructed in memory, as well as a data gathering process componentry [30] and a reporting process componentry [31]. The user interacts with the system using a mobile and/or a personal computer [33], which may have either a Graphical User Interface Application [25] or a web-based application [26] that may also be connected over a network/Internet connection [28]. The Sparse Predictive Hierarchy [27], by learning to model the patterns of temporal evolution of the streams of signals from the data sources [32], is capable of detecting and signalling to the user, via the Graphical User Interface Application [25] on the client device, the presence of anomalous patterns in the measured data, allowing them to take appropriate action.

Figure 2:
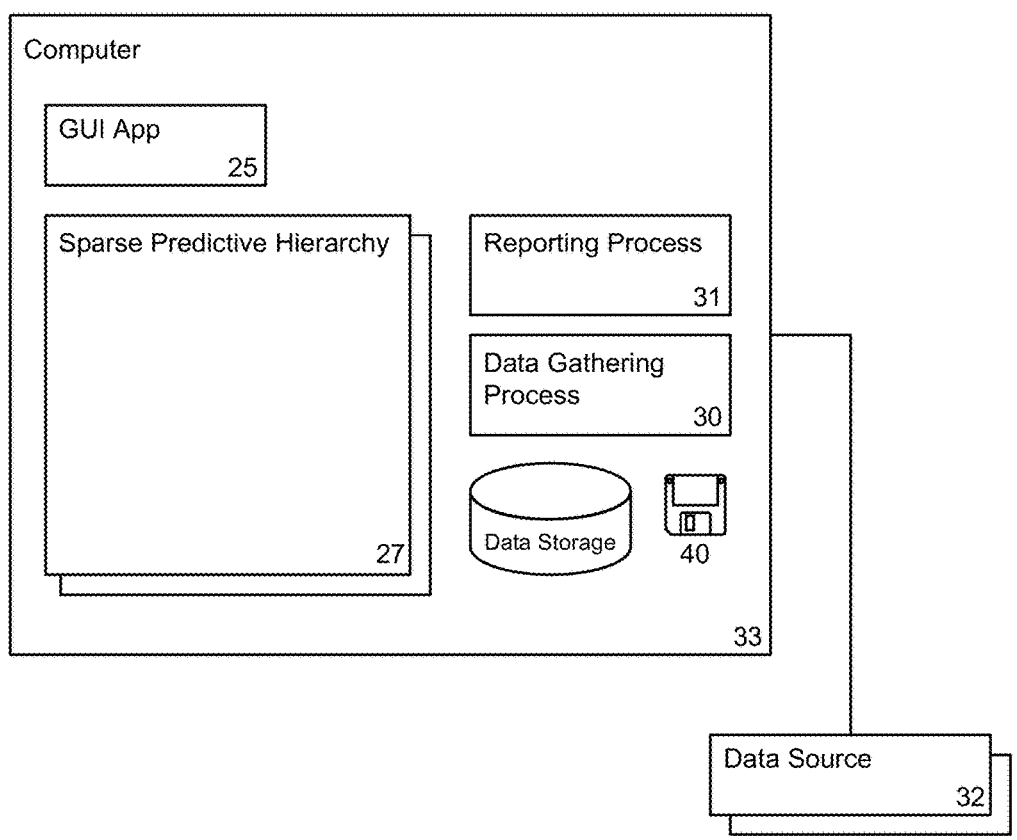
FIG. 2 is a block diagram of an example single-machine arrangement in which embodiments of the invention can be practiced.

FIG. 2 shows an Embodiment in which the system is contained in a single computer device (including eg a CPU processor circuit, memory, storage, GPU, FPGA etc), for example a personal computer [33], connected via a network/Internet connection [28] or other electronic signal communication to one or more data sources [32] (ie componentry which transforms or stores a record of some information of interest). The device executes program instructions from the stored program code [40], such that one or more Sparse Predictive Hierarchy [27] structures are constructed in memory, as well as a data gathering process componentry [30] and a reporting process componentry [31]. The user interacts with the system using a Graphical User Interface Application [25] or a web-based application [26]. The Sparse Predictive Hierarchy [27], by learning to model the patterns of temporal evolution of the streams of signals from the data sources [32], is capable of detecting and signalling to the user, via the Graphical User Interface Application [25], the presence of anomalous patterns in the measured data, allowing them to take appropriate action.

Figure 3:
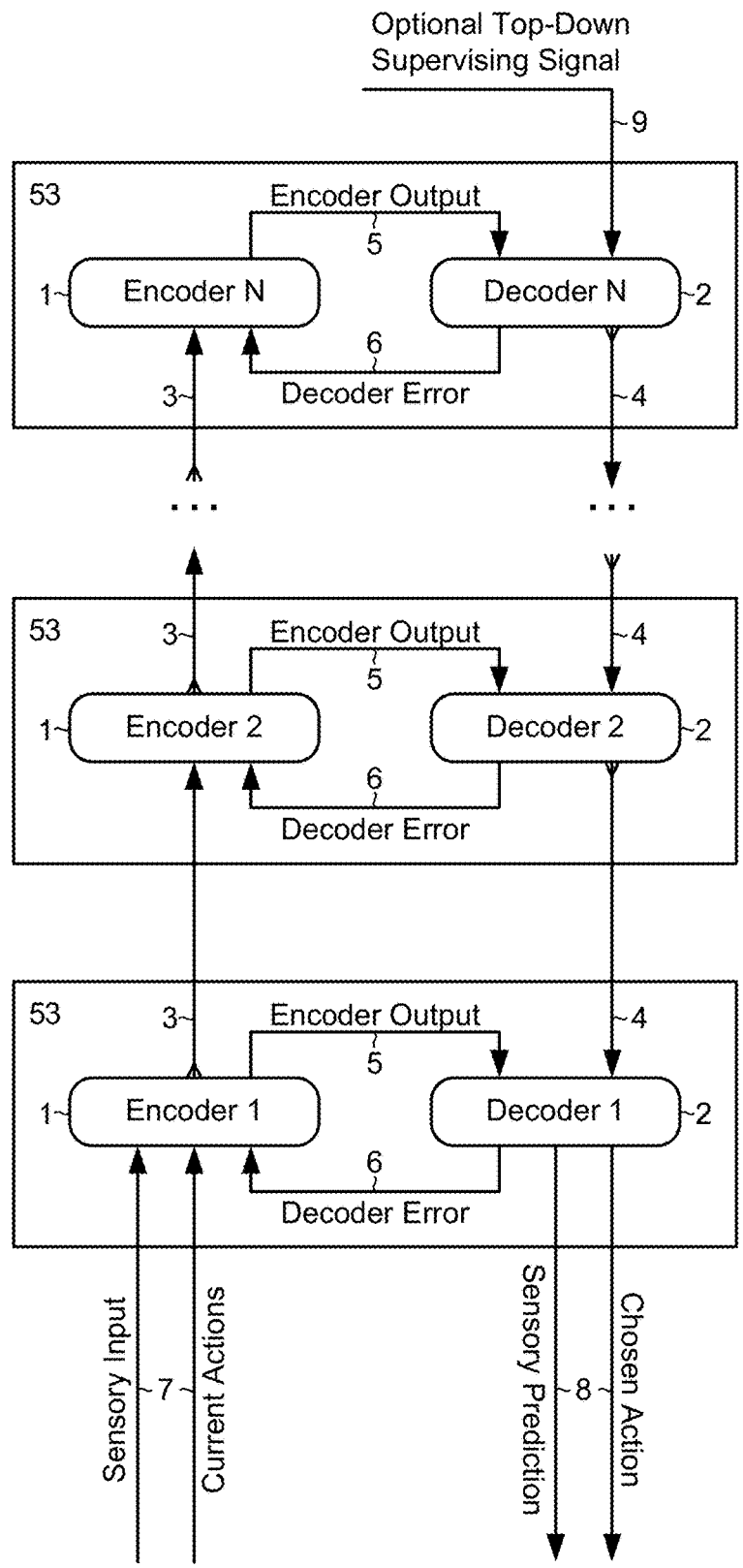
FIG. 3 is a block diagram of an example Sparse Predictive Hierarchy Network, which may be suitable for use in the arrangements of FIGS. 1 and 2.

FIG. 3 shows an arrangement of a typical embodiment of the Sparse Predictive Hierarchy. In FIG. 3, one sees a series of processing stages (layers), each processing stage [53] composed of a encoder [1] and a decoder [2] with preferable connections, encoder-decoder connection [5] and decoder-encoder connection [6], between them that enables the decoder [2] to predict the data coming from the encoder [1], also using its feedback connection [4], and the encoder [1] to represent the upcoming data from the feedforward connection [3] with the prediction errors of the decoder [2] via the decoder-encoder connection [6]. The ladder is fed a sensor and action input [7] and an optional top-down input [9], and produces a sensor prediction and chosen action output [8].

Figure 4:
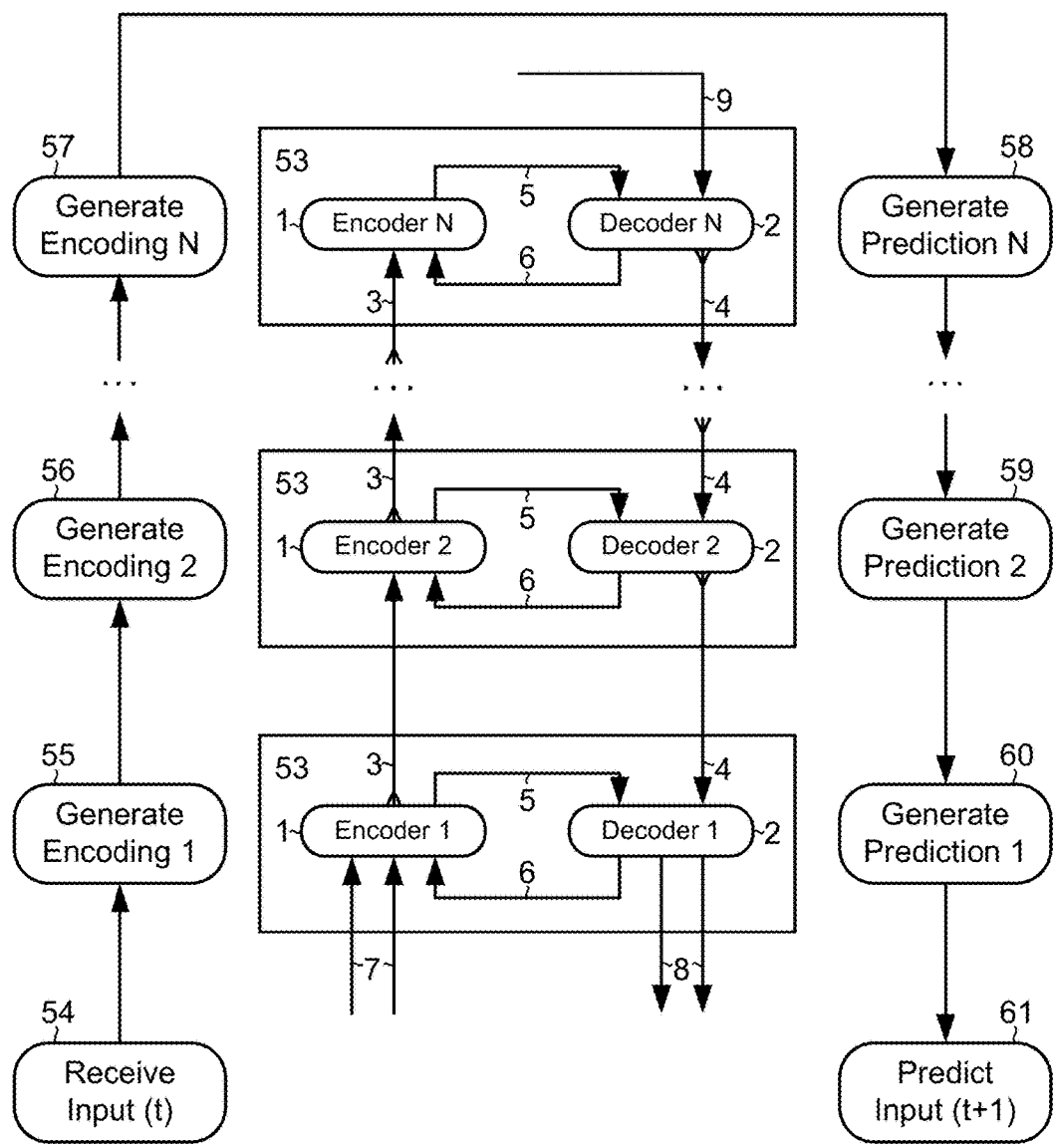
FIG. 4 is a flowchart showing an example method performed by the Sparse Predictive Hierarchy Network of FIG. 3.

In FIG. 4, the succession of steps for encoding and prediction in a Sparse Predictive Hierarchy during a single timestep t are described in a flowchart, namely: receive input at timestep t [54] from the time-varying stream of data provided to the apparatus via the sensor and action input [7], generate encoding 1 [55] in the first processing stage [53] using this input (and previous values), generate encoding 2 [56] in the second processing stage using the encoding from the first processing stage [53], and so on until the $N^{th}$ processing stage will generate encoding N [57]. Using the resulting encoding, the decoder of the $N^{th}$ processing stage will generate prediction N [58], which predicts the input received at the encoder of the $N^{th}$ processing stage at a next timestep. This prediction is sent to the decoder of the $(N-1)^{th}$ processing stage, where it is combined with the already-produced encoding for time t output by the corresponding encoder of the $(N-1)^{th}$ processing stage. The succession is continued at each $i^{th}$ processing stage, where a feedback prediction from the decoder of the $(i+1)^{th}$ processing stage is combined with the already-produced encoding for time t output by the corresponding encoder of the $i^{th}$ processing stage, and decoded to produce a prediction of the same encoder's input at a next time step. Finally, the decoder of the second processing stage will generate prediction 2 [59] and provide this prediction to the decoder of the first processing stage, which will generate prediction 1 [60]. This prediction is used to predict the input at next timestep [61] of the Sparse Predictive Hierarchy.

Figure 5:
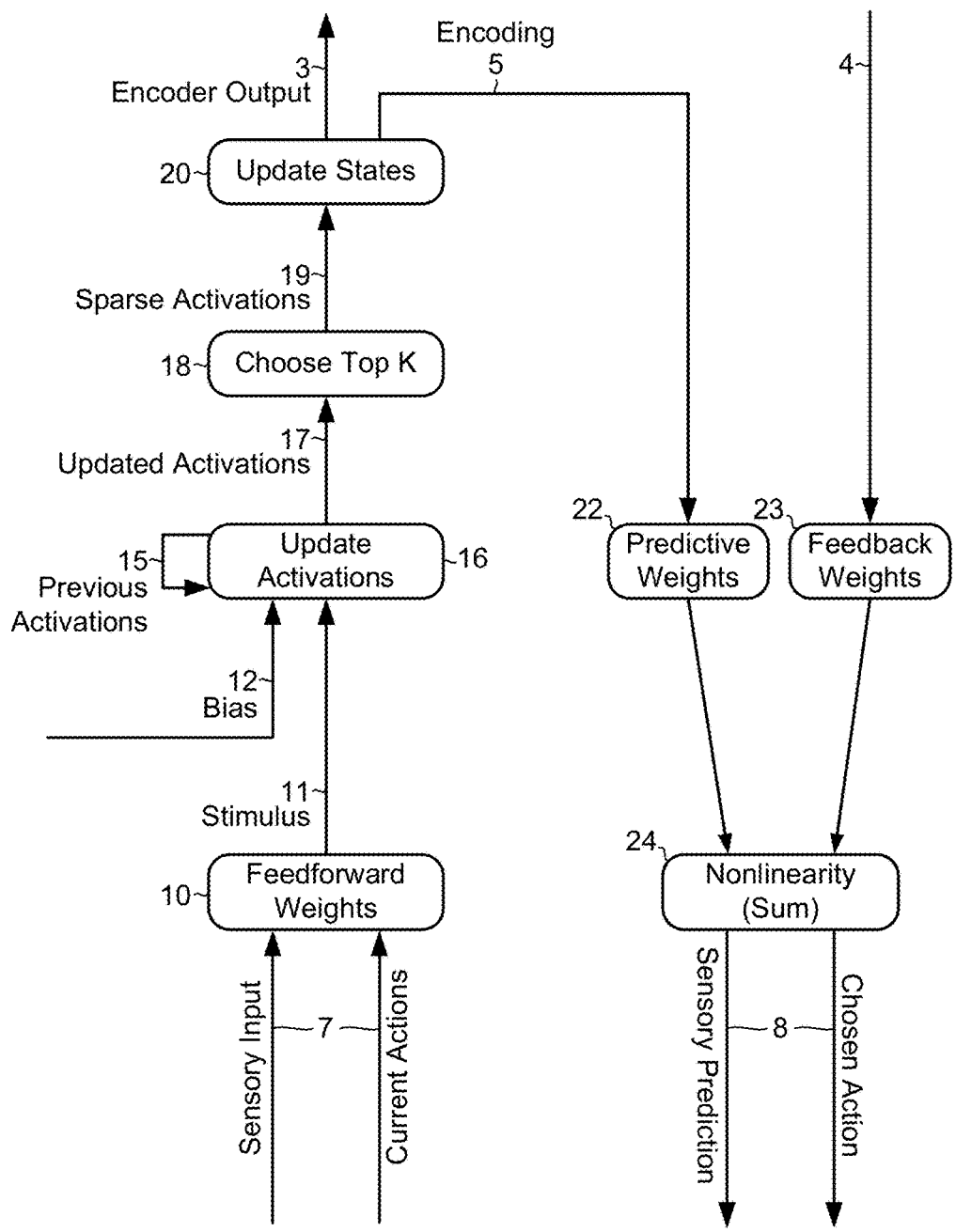
FIG. 5 is a block diagram showing an example Encoder/Decoder pair, which may be employed in the Sparse Predictive Hierarchy Network of FIGS. 3 and 4.

FIG. 5 shows an arrangement of a typical embodiment of a single processing stage, which comprises Encoder/Decoder pair. In FIG. 5, one sees the sensor and action input [7] multiplied by the feedforward weight matrix [10] to produce the stimulus vector [11]. The previous activation [15] is combined with the stimulus vector [11] and cell biases [12] to update activation [16] values in the activation vector [17]. That is then fed through a top-k chooser [18] to produce a sparse activation [19], which is used to update states [20]. The resulting states form the output of the encoder [1] which is passed up the feedforward connection [3].

FIG. 5 further shows that the output from the encoder [1] is passed via the encoder-decoder connection [5] to the top of the decoder, where it is multiplied by the predictive weight matrix [22]. The feedback signal from the feedback connection [4] is similarly multiplied by the feedback weight matrix [23], and the predictive and feedback signals are fed through a summation and a nonlinearity [24] to produce the decoder's sensor prediction and chosen action output [8].

Figure 6:
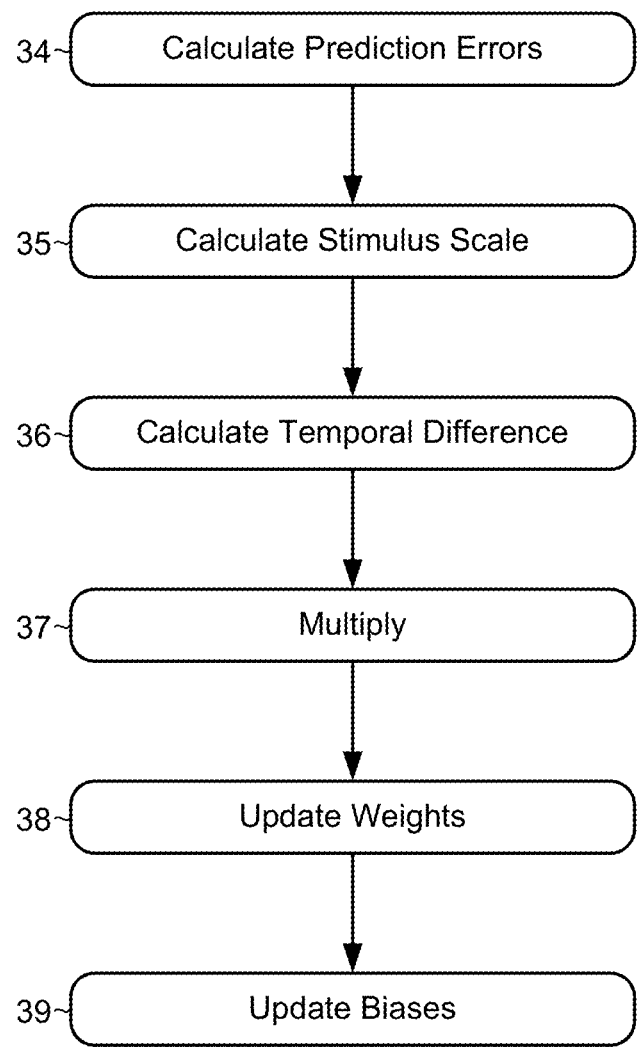
FIG. 6 is a flowchart showing an example method of encoder learning.

FIG. 6, the succession of steps for learning in the Sparse Predictor encoder are described in a flowchart, namely: calculate prediction errors [34], calculate stimulus scale [35], calculate temporal difference [36] and multiply [37], update weights [38], and update biases [39].

Figure 7:
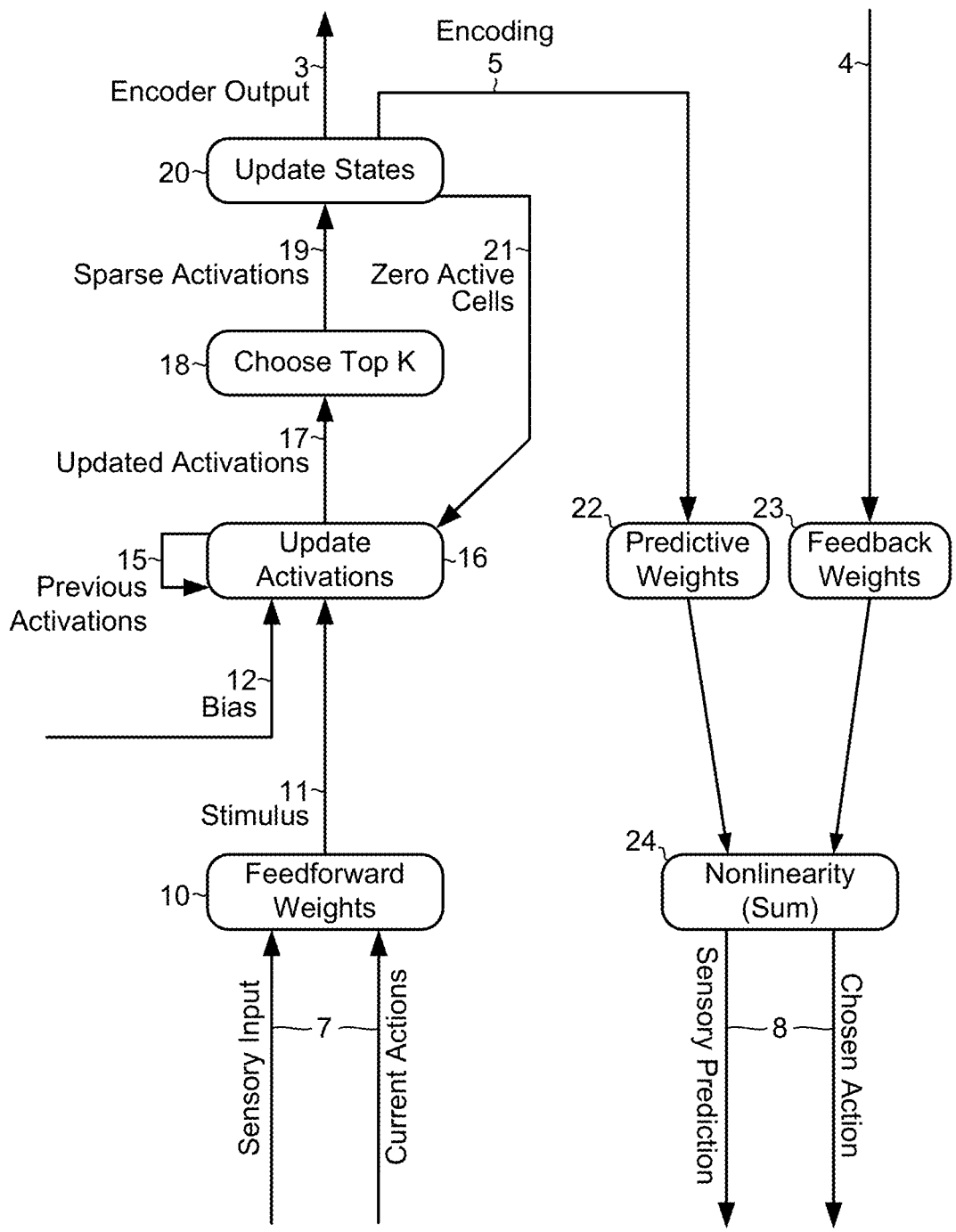
FIG. 7 is a block diagram of an example Delay Encoder/Linear Decoder pair.

FIG. 7 shows an arrangement of a typical embodiment of a single Delay Encoder/Decoder pair. In FIG. 7, one sees the sensor and action input [7] multiplied by the feedforward weight matrix [10] to produce the stimulus vector [11]. The previous activation [15] is combined with the update activation [16], stimulus vector [11], and cell biases [12], to produce the activation vector [17]. That is then fed through a top-k chooser [18] to produce a sparse activation [19], which is used to update states [20]. The resulting states form the output of the encoder [1] which is passed up the feedforward connection [3]. This output is further used to zero the firing activations [21] as those cells have already fired.

FIG. 7 further shows that the output from the encoder [1] is passed via the encoder-decoder connection [5] to the top of the decoder, where it is multiplied by the predictive weight matrix [22]. The feedback signal from the feedback connection [4] is similarly multiplied by the feedback weight matrix [23], and the predictive and feedback signals are fed through a summation and a nonlinearity [24] to produce the decoder's sensor prediction and chosen action output [8].

Figure 8:
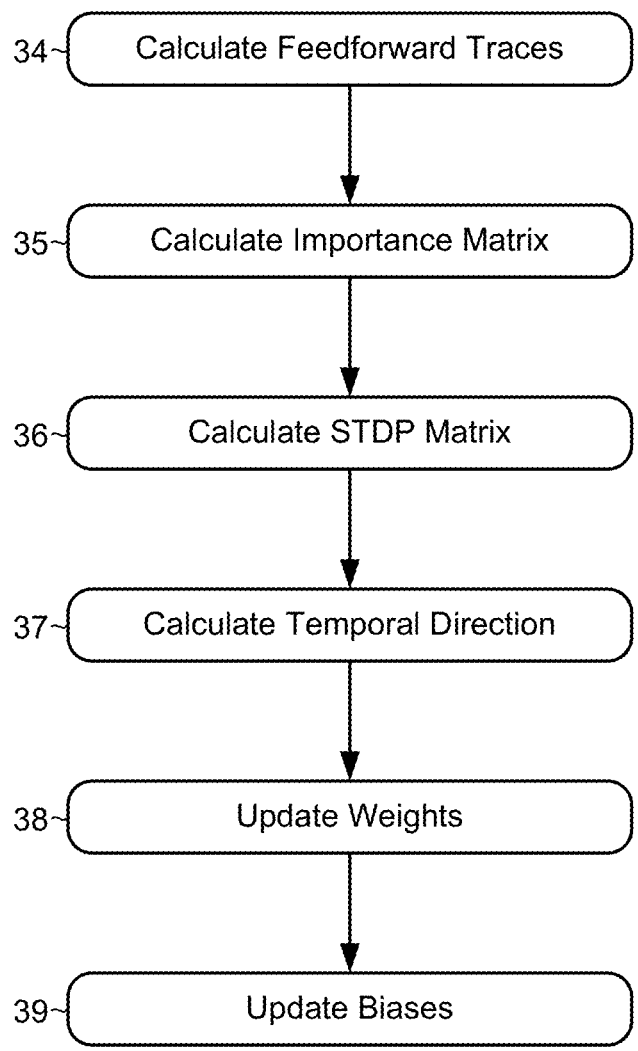
FIG. 8 is a flowchart showing an example method for delay encoder learning.

FIG. 8, the succession of steps for learning in the Delay Encoder are described in a flowchart, namely: calculate feedforward traces [34], calculate importance matrix [35], calculate STDP matrix [36], calculate temporal direction [37], update weights [38], and update biases [39].

Figure 9:
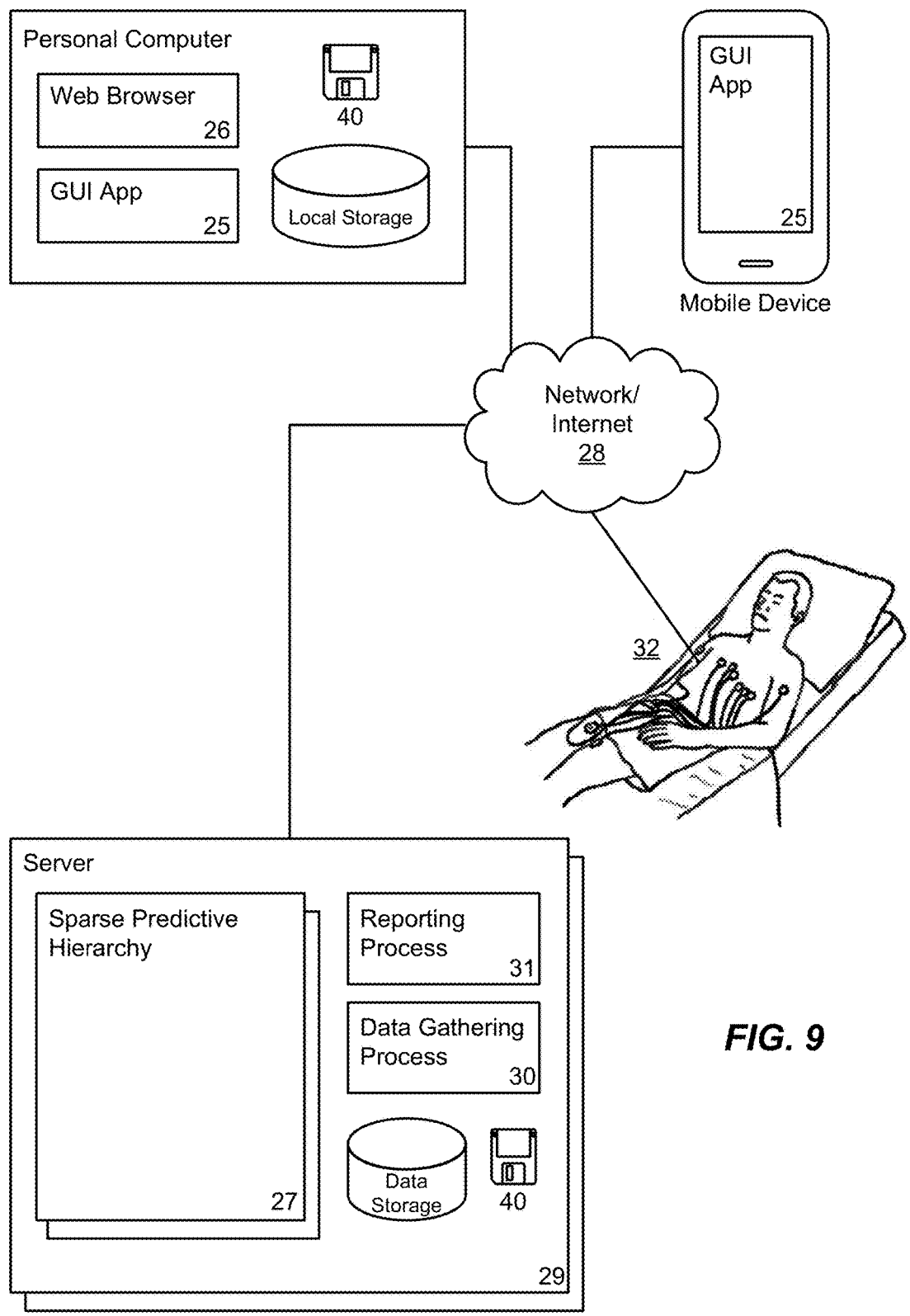
FIG. 9 is a block diagram showing an example network arrangement in which the Sparse Predictive Hierarchy Network of FIGS. 3 and 4 may be employed in an Electrocardiograph (ECG) measurement system.

In one example application, a medical practitioner is concerned with the output from one or more sensors, in this example a heart monitor or Electrocardiograph (ECG). Following the schematic of FIG. 9, the heart monitor sensors are configured as data sources [32] and connected via a network/Internet connection [28] to one or more server devices [29], each of which contains at least one Sparse Predictive Hierarchy [27] as well as a data gathering process componentry [30] and a reporting process componentry [31]. The user interacts with the system using a mobile and/or a personal computer [33], which may have either a Graphical User Interface Application [25] or a web-based application [26], that may also be connected over a network/Internet connection [28]. The Sparse Predictive Hierarchy [27], by learning to model the patterns of temporal evolution of the streams of signals from the data sources [32], is capable of detecting and signalling to the user, via the Graphical User Interface Application [25], the presence of anomalous patterns in the measured heart, allowing the user and/or the medical practitioner to take appropriate action, such as providing appropriate treatment to prevent or mitigate harm to the patient.

Figure 10:
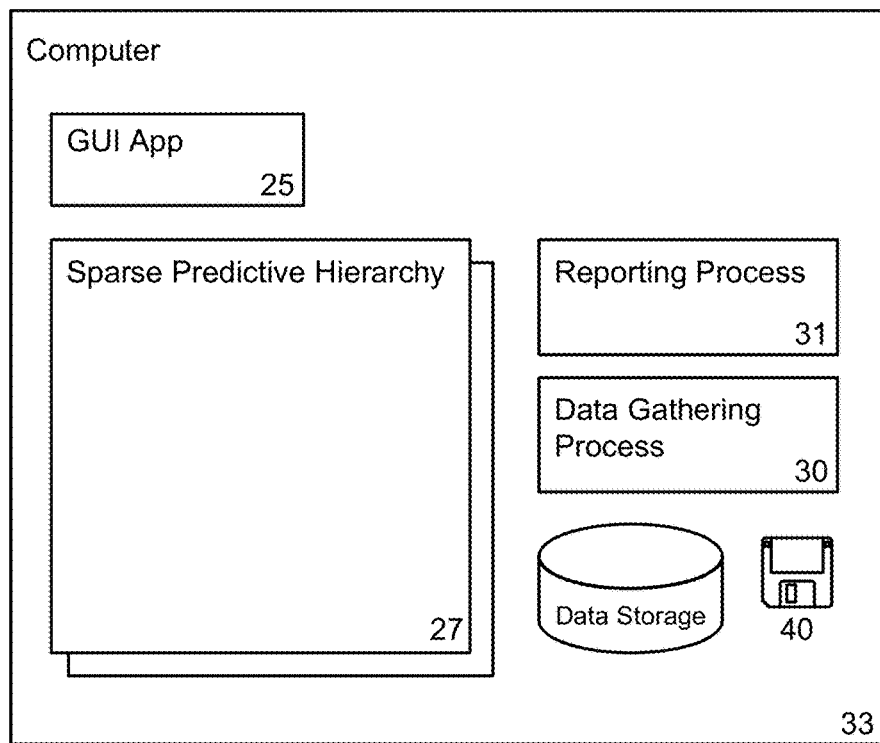
FIG. 10 is a block diagram showing an example single-machine arrangement in which the Sparse Predictive Hierarchy Network of FIGS. 3 and 4 may be employed in an Electrocardiograph (ECG) measurement system.
Figure 10:
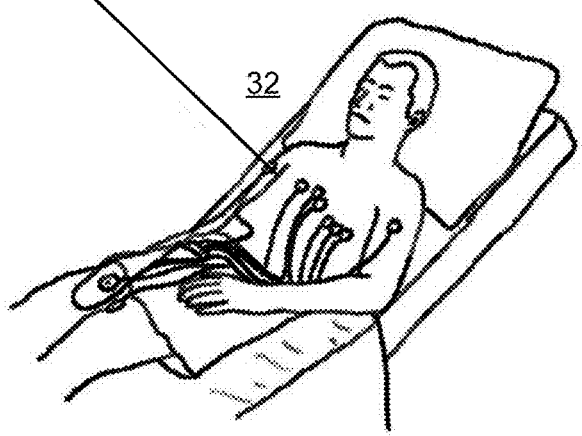

In another example application, the user and patient are one and the same, and the entire system is contained in a mobile application (following the schematic of FIG. 10), connected to an ECG sensor array. In this case, the system is designed to provide an early-warning to the user/patient that anomalous patterns have been detected and that appropriate action should be taken.

In both these example applications, the fact that the Sparse Predictive Hierarchy [27] is an efficient, low-complexity system for online learning of individual streams of data, requiring little or no expert setup, configuration or monitoring, is key to the practical usefulness of embodiments of the invention and the example application embodiments.

Figure 11:
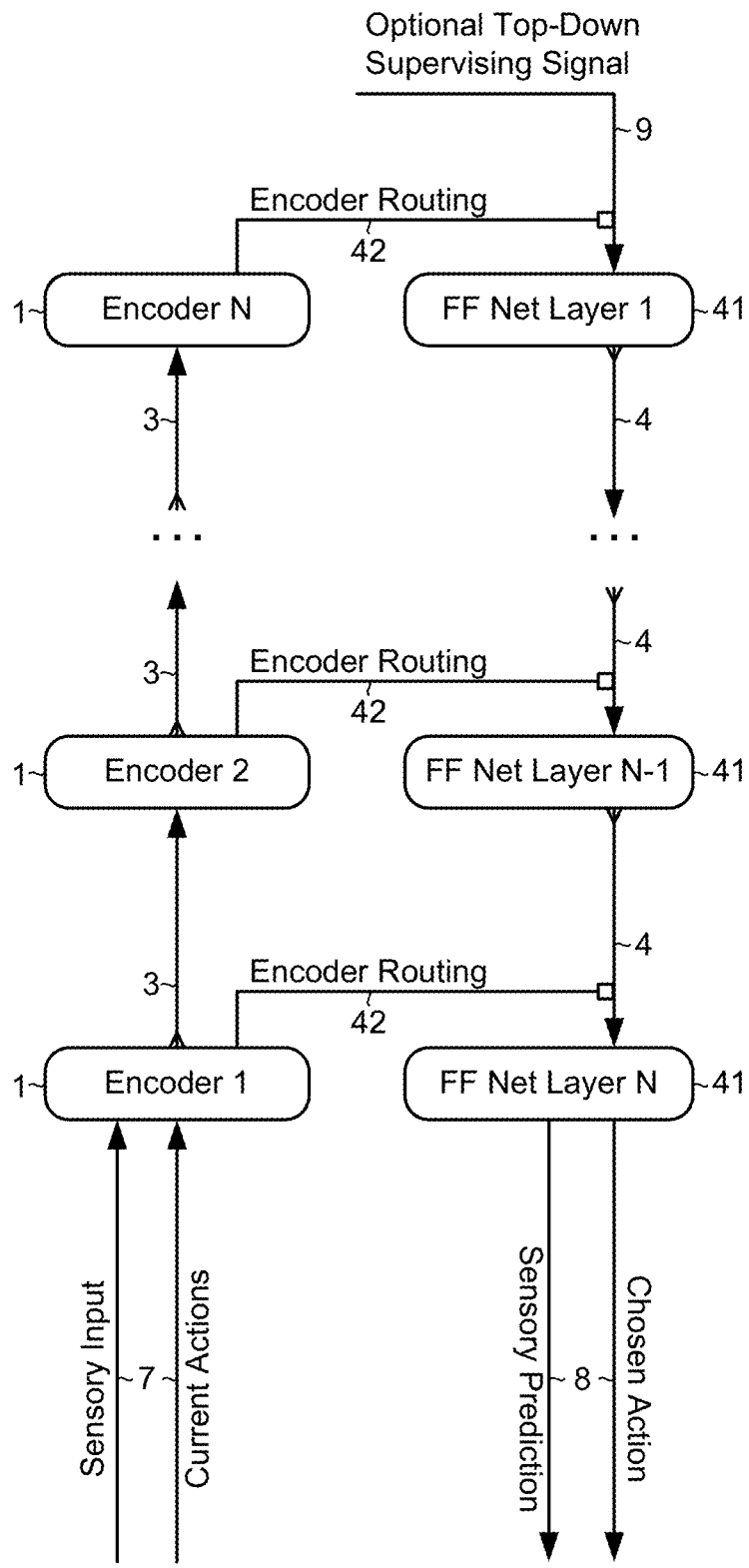
FIG. 11 is a block diagram of an example Routed Predictive Hierarchy Network.

FIG. 11 shows an arrangement of a typical embodiment of the Routed Predictive Hierarchy Network. In FIG. 11, one sees a series of layers, each composed of an encoder [1] and a neural net layer [41] with preferable connections, encoder modulation connection [42] between them that enables the neural net layer [41] to form a subnetwork chosen by the data coming from the encoder [1], which modulates its inputs via the feedback connection [4], and the encoder [1] to represent the upcoming data from the feedforward connection [3]. The hierarchy is fed a sensor and action input [7] and an optional optional top-down input [9], and produces a sensor prediction and chosen action output [8].

Figure 12:
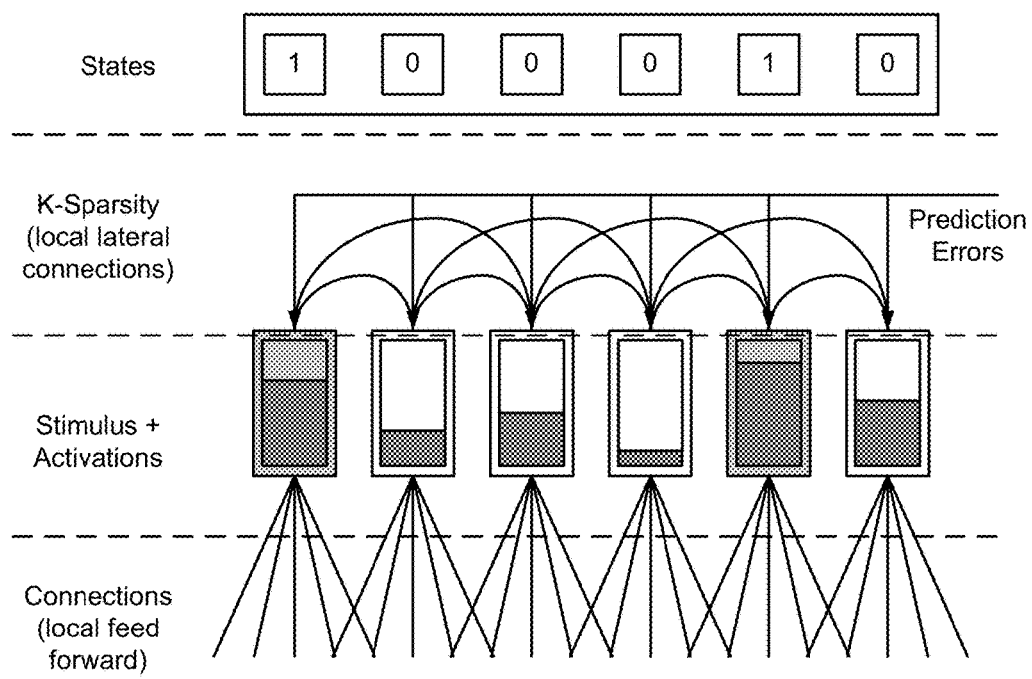
FIG. 12 is a schematic diagram showing production of delay encoder states.

FIG. 12 depicts the cell components including activations, states, and connections in an example embodiment of a delay encoder module.

Figure 13:
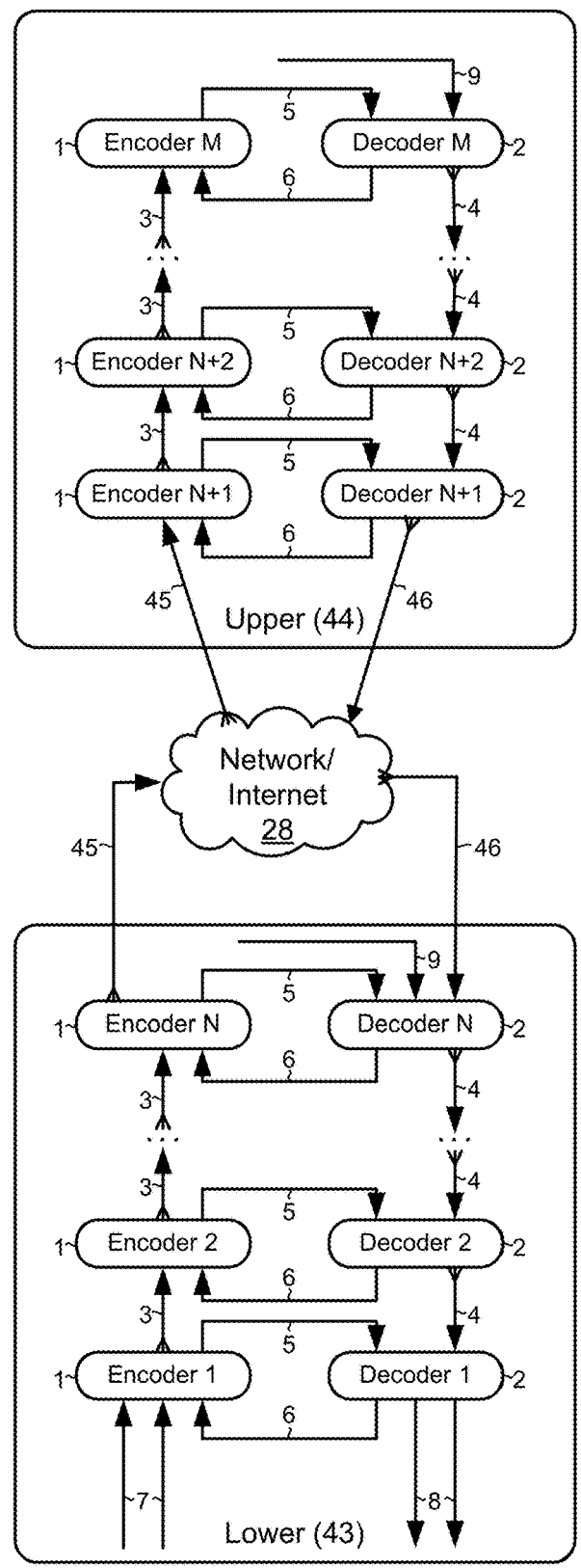
FIG. 13 is a block diagram of an example Distributed Sparse Predictive Hierarchy.

FIG. 13 shows an arrangement of a distributed embodiment of the Sparse Predictive Hierarchy Network. In FIG. 13, the lower hierarchy [43] can operate in standalone mode or can be augmented by at least one upper hierarchy [44], which may be running in a server cluster or local PC's. The lower hierarchy [43] may be connected via a network/Internet connection [28] to the upper hierarchy [44] by one or both of the links depicted, namely the upward directed links [45] and downward directed links [46], which typically serve the same purpose as the feedforward connection [3] and feedback connection [4] respectively inside a Sparse Predictive Hierarchy Network. It may be seen that any number of devices may be connected in this manner to operate the distributed embodiment.

Figure 14:
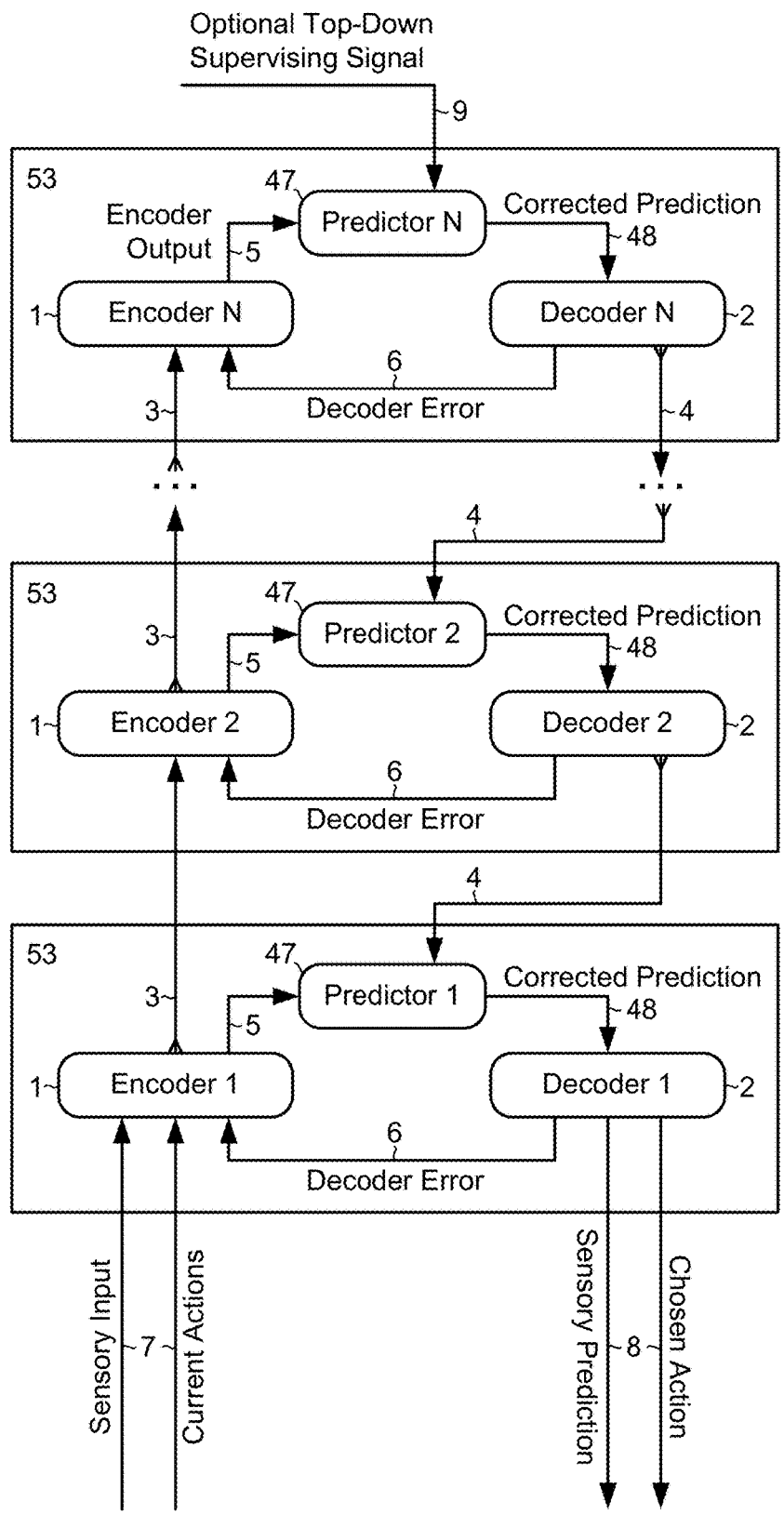
FIG. 14 is a block diagram of an example of a Time Division Feedback Sparse Predictive Hierarchy.

FIG. 14 shows an arrangement of a typical embodiment of the Sparse Predictive Hierarchy Network with Time Division Feedback. In FIG. 14, one sees a series of layers, each composed of a encoder [1], a time division feedback predictor [47] and a decoder [2] with preferable connections, encoder-decoder connection [5] and decoder-encoder connection [6], between them that enables the decoder [2] to predict the data coming from the encoder [1], also using its feedback connection [4], and the encoder [1] to represent the upcoming data from the feedforward connection [3] with the prediction errors of the decoder [2] via the decoder-encoder connection [6]. The hierarchy is fed a sensor and action input [7] and an optional top-down input [9], and produces a sensor prediction and chosen action output [8].

The time division feedback predictor [47] performs the transformation of the upper layer feedback output into the appropriate signal to combine with that from the same-layer encoder. In representation mode, this feedback signal is used to augment the representation produced by the encoder. In predictive coding mode, this feedback signal is used to correct the encoder's prediction signal. In either mode, the time division feedback predictor [47] feeds the decoder [2] with the feedback-corrected prediction [48] signal.

In the Sparse Predictive Hierarchy Network with Time Division Feedback depicted in FIG. 14, the feedforward connection [3] and feedback connection [4] between each layer are each composed of $n_s$ connections, one for each lower layer timestep, thus requiring an equal number of weight matrices. The stimulus in each encoder is thus calculated by summing the stimuli for $n_s$ inputs together, and likewise the feedback connection [4] provides $n_s$ feedback signals to the lower layer, one for each of its timesteps. A stride of 2 or 3 is sufficient to ensure that many hundreds of bottom layer inputs are strided by layers only ten or so layers up.

Figure 15:
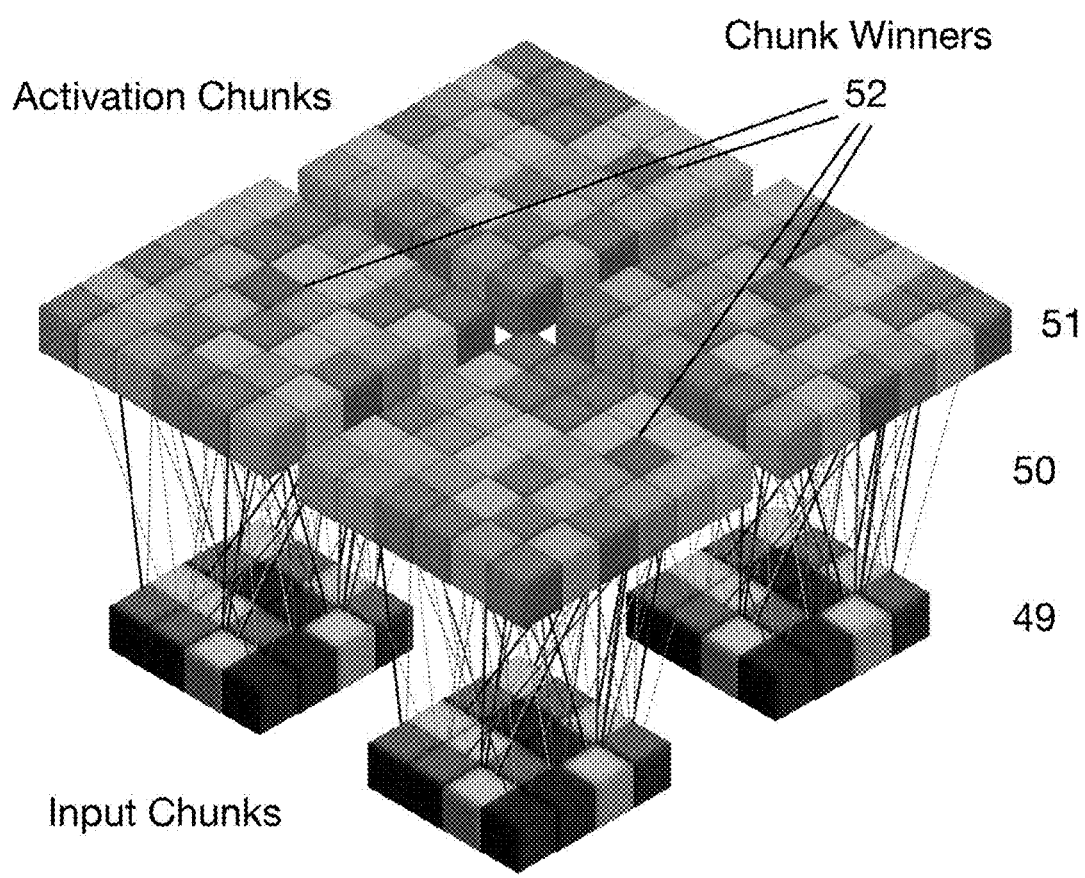
FIG. 15 is a perspective view of an example tiled Chunk Encoder.

FIG. 15 shows an schematic of a typical embodiment of the Chunk Encoder. Each chunk (four are shown) in the encoder has a visible receptive field [49] in its input layer, which is transformed by the chunk's local weight matrix [50], giving rise to a pattern of activation in the hidden chunk [51]. The highest activated units in each chunk are chosen as the chunk winners [52], which are used as the encoding for the entire encoder.

Figure 16:
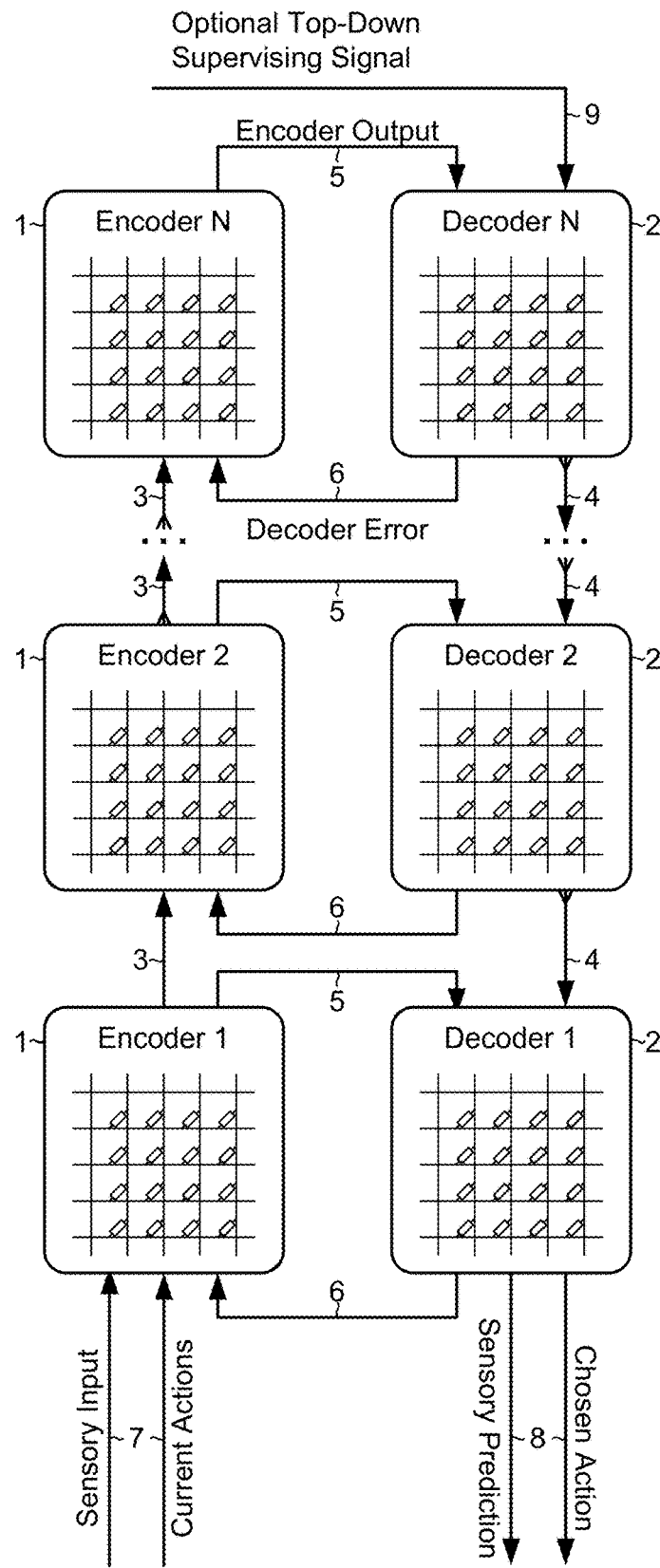
FIG. 16 is a schematic diagram of an example Sparse Predictive Hierarchy based on Memristor Crossbars.

FIG. 16 shows an arrangement of a typical embodiment of the Sparse Predictive Hierarchy Network based on Memristor Crossbar Circuitry. In FIG. 16, one sees a series of layers, each composed of a encoder [1] and a decoder [2] with preferable connections, encoder-decoder connection [5] and decoder-encoder connection [6], between them that enables the decoder [2] to predict the data coming from the encoder [1], also using its feedback connection [4], and the encoder [1] to represent the upcoming data from the feedforward connection [3] with the prediction errors of the decoder [2] via the decoder-encoder connection [6]. The hierarchy is fed a sensor and action input [7] and an optional top-down input [9], and produces a sensor prediction and chosen action output [8].

It will be clear to those skilled in the art that the encoders and decoders using Memristor Crossbar Circuitry as depicted in FIG. 16 may be replaced by analog discrete circuits, digital differential analyser circuits, integrated ASIC circuitry (both analog and digital), FPGA circuitry, or any combinations thereof. Such circuits may be constructed so as to exactly correspond to the encoder/decoder designs as described elsewhere in the instant application, or as appropriate, they may use variations on such designs which take advantage of the properties of the hardware circuitry.

Further Example Applications

A further example application is in frame-by-frame video prediction. Learning is a straightforward matter of generating prediction errors by comparing the output prediction $y_{t-1}$ with the true next frame $x_t$. When provided with the first few frames ($\tau_{init}$) of a learned sequence, the system proceeds to play out a learned version of the same sequence, driven by feeding the prediction frame $y_{t-1}$ as the new input $x_t$, for $t > \tau_{init}$ A further example application is in Video Super-resolution. Most state-of-the-art methods use only single frames to perform video super-resolution, or deliberately employ shuffling of frames to make successive images as i.i.d as possible. Only a few methods exploit the temporal coherence of real-world video sequences. A system based on a Sparse Predictive Hierarchy maximally exploits the spatiotemporal coherence of objects in real-world video. The basic method of training is to provide a low-resolution ($\hat{m} \times \hat{n}$ pixels) video stream $\hat{x}_t$ to the lowest layer of the Sparse Predictive Hierarchy, and have the bottom decoder use a size equivalent to the full resolution video (m×n). The output decoding y of the bottom layer is then compared with the high-resolution training input x in order to generate the prediction errors for learning.

A further example application is in Image noise reduction. Image denoising applications are trained by providing as input a noised input image $\hat{x}$ and generating prediction errors by comparing the decoder output y with the original clean image x. A further example application is in Audio noise reduction, using a similar scheme.

A further example application is in Anomaly Detection. The prediction error vector is used to compute raw anomaly scores, which may be further processed to identify statistical anomaly likelihoods. Applications of anomaly detection include stroke prediction, cardiac monitoring, clinical monitoring in intensive care settings, monitoring of dementia sufferers, security, fraud detection, monitoring of industrial plant and equipment, energy production, vehicle maintenance, counterterrorism, etc.

A further example application is in Video Anomaly Detection, with the additional functionality of overlaying the prediction errors on the input video, allowing an operator to identify the nature of the anomaly visually. This has applications in various areas, for example industrial quality control, security, surveillance, intrusion detection, earth sensing and healthcare.

A further example application is in Reinforcement Learning, as described in detail herein. Applications of the RL frameworks include self-driving cars, robotics, remote sensing, autonomous drones, robotic engineers (e.g for space exploration, hazardous repairs, etc), and many more.

Typical Example of Predictive Hierarchy Construction

When the computer begins the execution of the stored program code, each predictive hierarchy is constructed in the memory of the system as follows (for l layers, $m_{in} \times n_{in}$ inputs, and $m_{out} \times n_{out}$ outputs):

1. allocate sparse predictors for each layer
2. allocate 2D arrays for each layer for pooling data, array size is proportional to the layer size.

Each sparse predictor contains a collection of visible and hidden layers indexed by i. Visible (input-facing) layers have size $m_{vis}^i \times n_{vis}^i$, and hidden (output-facing) layers have size $m_{hid}^i \times n_{hid}^i$.

Each sparse predictor visible layer is constructed as follows:

1. allocate $m_{vis}^i \times n_{vis}^i$ 2D arrays for the derived input D and reconstruction error $E_Y$, zero filled.
2. if the layer is designed for input; allocate 4D arrays $W_{enc}$ for encoder weights, initially random. In one class of embodiments, connections are sparse, so weight matrices are of size $\hat{m}_{vis}^i \times \hat{n}_{vis}^i \times m_{hid}^i \times n_{hid}^i$ for a chosen receptive field (window) size $\hat{m}_{vis}^i \times \hat{n}_{vis}^i$. In another class of embodiments, weight matrices are fully connected, so the dimensions are $m_{vis}^i \times n_{vis}^i \times m_{hid}^i \times n_{hid}^i$.
3. if the layer is designed to perform predictions; allocate 4D arrays for feedback decoder weights $W_{fb}$ and lateral decoder weights $W_{lat}$, and 2D arrays for predictions Y, feedback predictions $Y_{fb}$, and laterally-sourced predictions $Y_{lat}$. 2D arrays are of size $m_{vis}^i \times n_{vis}^i$ and initialised to zero, 4D weight matrices are sparse or fully connected, depending on the embodiment. Weight arrays initially random in a given range.

Each sparse predictor hidden layer is constructed as follows:

1. allocate $m_{hid}^i \times n_{hid}^i$ 2D arrays for activations A, biases B, hidden states Z, stimulus summations S and error summations $E_Z$, next layer inputs $Z^{max}$ (if max-pooling is enabled).
2. randomly initialize the biases array B, and zero fill the activation and state arrays.

Several of the 2D arrays and 4D matrices (including D, S, Z in some embodiments, and the W's) described above will actually contain a second 'plane' of values, often used to store some history information of additional utility when combined with the values in the first 'plane'. Thus, for example, the derived input D stores a copy of the immediate input $x_{ij}$ in $d_{ij}^1$, along with a moving average of past inputs in $d_{ij}^2$, and the temporal difference $d_{ij}^1 - d_{ij}^2$ is used in several places in the system.

Since the componentry is designed to model temporal evolution of the data, each sparse predictor is constructed with a "previous" copy of each 2D array and 4D weight matrix described above, denoted by a bar symbol, thus for example the previous activations are denoted $\bar{A}$. At the beginning of each timestep, the arrays and weight matrices are swapped, so for example $\bar{A}$ takes on the values of A, and A is either reset to zero or simply overwritten with new values during the processing.

Depending on the platform, hardware or programming system employed in a particular embodiment of the invention, it may be more appropriate to employ 3D matrices in place of 4D matrices as described herein. In such cases the dimensions of the 3D matrix would be $(\hat{m}_{vis} \times \hat{n}_{vis}, m_{hid}, n_{hid})$ and the element $w_{ijkl}$ of the 4D matrix would be the element $w_{\hat{i}kl}$ of the 3D matrix, where $\hat{i} = i\hat{n}_{vis} + j$. Similar reshaping to use only 1D arrays if necessary will be familiar to those skilled in the art.

In the following, values may be calculated by ranging over a neighbourhood N(ij, r) of some position (i, j) with a "radius" r. This neighbourhood ranges from i−r to i+r in one dimension, and from j−r to j+r in the other. In some embodiments the "radii" in each dimension may not be identical, so in general $r = (r_x, r_y)$ may define a rectangular neighbourhood or window which is used for the calculation. In some cases where the sizes of the arrays differ, the system calculates a "center" $(k_0, l_0)$ in the second array corresponding to the position (i, j) in the first, and this is denoted as follows $(k_0, l_0) \leftarrow \text{projection}_{S \rightarrow D}(i,j)$. In this case the neighbourhood will be $N(k_0, l_0, r)$. Finally, depending on the embodiment or parameters chosen by the user, the window may or may not include the 'center' element itself (eg inhibition ignores the center).

Typical Example of Predictive Hierarchy Processing simStep(inputs, learn) runs the hierarchy encoding and decoding passes, generates predictions and performs learning optionally. The upward pass involves feeding the encoders at each layer with the output of the lower layer encoder (or the input in the case of the bottom layer). The downward pass likewise involves running the decoders from top to bottom, processing top-down feedback from higher layers and the encoder output from the same layer. The prediction errors for each layer are then computed by comparing the predictions with the actual outputs and finally learning in the hierarchy updates the various weights and biases.

| Procedure simStep(inputs, learn?) |
| --- |
| Data: image inputs, learning control learn<br>Result:<br>begin<br>    encodeHierarchy(inputs)<br>    decodeHierarchy(inputs)<br>    hierarchyErrors(inputs)<br>    if learn? then learnHierarchy(inputs) |

The inputs here are shown as a single array of values for simplicity. The surrounding application or agent provides this input in each embodiment, so the structure and semantics of each input are application-dependent.

In some cases, the input may consist not only of sensory inputs such as video or image data, but may also include, for example, action selection information for a learning agent performing a task (e.g. in robotic applications). In this case the output of the hierarchy may represent the choice of action the agent should take, along with its sensory prediction.

In addition, the hierarchy may be configured to produce any desired form of output simply by specifying the size of the output of the bottom decoder. For example, in an embodiment performing video super-resolution, the input may be the low-resolution video stream, and the output may be the desired high-resolution video.

encodeHierarchy( ) passes input into the hierarchy, and run the up-pass for each layer. In some embodiments, and depending on the settings, the input to the hierarchy may be preprocessed in some way (this is called whiten( ) in the example pseudocode below). For each layer, the encoder component processes the input, the encoder output states may then be optionally max-pooled (to add invariance), and the output is then passed up to the next higher layer.

| Procedure encodeHierarchy(inputs) |
|---|
| Data: image inputs<br>Result:<br>begin<br>    if whiten then inputs ← whiten(inputs)<br>        visibles ← inputs<br>        foreach layer l do<br>            l.states ← l.activateEncoder(visibles, λ)<br>            l.max Pool ← maxPoolKernel(l.states, poolRadius)<br>        visibles ← l.maxPool |

The whiten( ) function above is one example of preprocessing, in this case being a component which shifts the values of an input image frame such that its mean and variance are of an appropriate value. It will be clear to those skilled in the art that input data of various types may be preprocessed in a number of ways in order to alter the characteristics of the data as deemed most suitable to the task at hand.

activateEncoder( ) and its kernels pass the hierarchy's inputs up from layer to layer. The input is first combined with its historical values to generate a derived input, and then converted into a stimulus which is the size and shape of the output encoding. The stimulus is combined with each unit's bias to produce the activation (which may include information about previous stimuli), and finally the usually sparse hidden states are computed as the output of the encoder stage.

| Procedure activateEncoder(visibles, λ) |
|---|
| Data: visible input X, previous $\overline{D}$, biases B, weights $W_{enc}$, decay λ, pooling $\beta_{pool}$<br>Result: derived input D, stimulus S, activations A, hidden states Z<br>begin<br>    D ← deriveInputKernel(X, $\overline{D}$, λ)    // derived input<br>    if layer used for input then<br>        S ← encodeKernel(D, $\overline{S}$, $W_{enc}$, r)    // compute stimulus<br>    A ← activateKernel(S, $\overline{B}$, $\overline{A}$, $\beta_{pool}$)    // compute activations<br>    Z ← solveHiddenKernel(A, $r_{inhibit}$)    // compute hidden states | deriveInputKernel produces a pair of inputs for the encoder, one a copy of the input and the other a moving average of recent inputs.

| Procedure deriveInputKernel(inputs, outputsPrev, λ) |
|---|
| Data: visible inputs X, previous output $\overline{D}$, decay λ<br>Result: derived output D, $d_{ij}^1$ is the input copied, $d_{ij}^2$ is decayed<br>for $x_{ij} \in X$ do<br>    $d_{ij}^1 \leftarrow x_{ij}$<br>    $d_{ij}^2 \leftarrow \lambda \overline{d}_{ij}^2 + (1 - \lambda) x_{ij}$    //decay previous | encodeKernel produces the encoder's stimulus, which is a weighted sum of each unit's derived inputs. The second element of the stimulus is a running sum of the squared norm of the weights used for each unit, which is used later to scale the encoder weight updates.

| Procedure encodeKernel(derivedInput, prevStimulus, weights, radius) |
|---|
| Data: derived inputs D, previous stimulus $\overline{S}$, weights $W_{enc}$, window radius r<br>Result: new stimulus S<br>for $\overline{s}_{ij} \in \overline{S}$ do<br>    $(k_0, l_0) \leftarrow$ projection$_{S \rightarrow D}(i, j)$<br>    $s_{ij}^1 \leftarrow \overline{s}_{ij}^1 + \Sigma_{kl \in N(k_0, l_0, r)} w_{ijkl}(d_{kl}^1 - d_{kl}^2)$<br>    $s_{ij}^2 \leftarrow \overline{s}_{ij}^2 + \Sigma_{kl \in N(k_0, l_0, r)} (w_{ijkl})^2$ |

In the above example pseudocode, the inputs on each connection are a kind of "delta" of the current input and the running average, as computed by the deriveInput function. This is merely one choice of input which is appropriate for many embodiments and tasks, but other choices may be used by the implementor.

The stimulus in this example pseudocode is computed by a weighted sum of inputs over a neighbourhood of input units "centered" in the input array. This is one possible choice of computation, and it will be clear that other versions of such a computation may be used instead. For example, the inputs to a unit may be randomly chosen from all inputs, or with a probability which varies with distance from the "center", and so on.

activateKernel updates the hidden activations by combining the stimuli and biases.

| Procedure activateKernel(stimulus, biases, activations, pooling) |
|---|
| Data: stimulus S, existing biases $\overline{B}$, previous activations $\overline{A}$, pooling $\beta_{pool}$<br>Result: new activations A<br>for $\overline{a}_{ij} \in \overline{A}$ do<br>    $a_{ij} \leftarrow \beta \overline{a}_{ij} + (1 - \beta)(s_{ij}^1 + \overline{b}_{ij})$ |

In this example pseudocode, the stimulus is combined with the bias for each unit by addition, and then "temporally pooled" with the previous activation. This pooling allows activations to build up in a unit over a number of inputs, allowing for the activation to represent a temporal combination of a number of inputs in the past. This process is similar to that used in the Delay Encoder described elsewhere. It may be seen that by varying the pooling parameter β in this component, either uniformly in the hierarchy or not, that the operator may vary the extent to which temporal pooling occurs in each encoder layer, and thus over which timescales the encoder gathers information about the predictive structure of the data.

solveHiddenKernel implements local inhibition on the activations to produce a sparse binary hidden state. First, each unit gathers information about its neighbours' relative levels, and then compares the number of more active neighbours with a threshold, only becoming active when the threshold is exceeded.

```
Procedure solveHiddenKernel(activations, radius)

Data: activations A, radius r
Result: new hidden states Z
for $a_{ij} \in A$ do
|   inhibition ← $\Sigma_{kl \in N(ij,r)}$ 1($a_{kl} \geq a_{ij}$)
|   $z_{ij}$ ← 1(inhibition < sparsity × ||N(ij, r)||)   //fire if winner
```

The example pseudocode implements a local inhibition process over a neighbourhood N(ij, r) of a unit, and imposes a local sparsity level which is a parameter for the encoder. This will be seen as one choice among several which may be used to control the number of active or firing units in the encoding. For example, an embodiment may use a global inhibition process which ignores the positions of the most active units and simply chooses the top k activations among all units.

In addition, this pseudocode produces a sparse binary encoding, but some embodiments or implementors may employ other, non-binary encodings, such as for example employing a rectified linear unit (ReLU) to produce a sparse continuous output.

Further, some embodiments may impose a "refractory period" on active states, for example by not allowing a unit to become active if it was active in the previous step (or in some number of previous steps). In such a case, the units will be prevented from remaining active too much, creating a kind of temporal sparsity in the encoding. Other similar methods might involve maintaining a decaying trace of previous firing and thus smoothly inhibit the reactivation of a unit. Finally, this temporal feedback inhibition may employ the process of setting the corresponding activation value of a unit to zero if it fires in the current timestep (as used in the Delay Encoder described elsewhere).

Another class of encoder embodiments may perform other versions of processes to generate the encoding. One such example is an iterative solver, which cycles over a number of substeps for each timestep, performing recurrent inhibition over the activations as they are accumulated, counting the number of times each unit fires during the timestep, and using that to perform inhibition and generate the states.

maxPoolKernel creates a summarised representation of the hidden state.

```
Procedure maxPoolKernel(states, radius)

Data: hidden states Z, radius r
Result: max-pooled $Z^{max}$
for $z_{ij}^{max} \in$ projection$_{Z \to Z^{max}}$ (Z) do
|   $z_{ij}^{max}$ ← max$_{kl \in N(ij,r)} z_{kl}$
```

Decoding information passes down the hierarchy, as each layer generates predictions by decoding its encoder's output, combined with feedback from higher layer decoder predictions. The feedback input $Z_{fb}$ is either the higher layer decoder output or the current hidden state in the case of the top layer. The decoder produces two predictions, one based on the feedback and the other, lateral prediction, on the corresponding encoder hidden state. These predictions are combined to produce the decoder's output.

```
Procedure decodeHierarchy

Result: prediction $Y_l$ for each layer
for each layer l in reverse order do
```

-continued

```
Procedure decodeHierarchy

|   if not top layer then $Z_{fb}$ ← $Y_{l+1}$
|   else $Z_{fb}$ ← Z
|   if l predicts then
|   |   $Y_{fb}$ ← decodeKernel($Z_{fb}$, $W_{fb}$, $r_{fb}$)      // decode feedback
|   |   $Y_{lat}$ ← decodeKernel(Z, $W_{lat}$, $r_{lat}$)            // decode laterally
|   |   $Y_l$ ← combinePredKernel($Y_{fb}$, $Y_{lat}$, blend)
```

In some embodiments, the decoder will use other inputs besides the (usually binary) hidden encoder states and higher layer decoder outputs. For example, the activation values used in the encoder may be used instead, since they contain more of the distributed information passing up the hierarchy. It will be clear that a number of alternative ways of connecting encoder and decoder may be employed depending on the task and the choice of the implementor.

decodeKernel transforms either the hidden or feedback inputs to the decoder using a weight matrix, forming a partial prediction.

```
Procedure decodeKernel(source, weights, radius)

Data: source Z, weights $W_{lat}$, window radius r
Result: predictions Y
for $y_{ij} \in Y$ do
|   ($k_0,l_0$) ← projection$_{Y \to Z}$(i, j)
|   $y_{ij}$ ← $\Sigma_{kl \in N(k_0,l_0,r)} z_{kl} w_{ijkl}$
```

As stated earlier, the above example pseodocode uses a weighted sum over a centered neighbourhood to compute the decoder's prediction for an output unit. This choice (which we denote as a "Linear Decoder") is one among many as mentioned earlier.

combinePredKernel blends the feedback and lateral predictions to produce a continuous (typically for the output decoder) or optionally locally sparse prediction output from the decoder.

```
Procedure combinePredKernel(fbPreds, latPreds, blend)

Data: feedback and lateral predictions $Y^{fb}$ and $Y^{lat}$, blend ratio b, radius r
Result: predictions Y
for $y_{ij} \in Y$ do
|   $y_{ij}$ ← (1 −b)$y_{ij}^{fb}$ + b$y_{ij}^{lat}$
if do inhibition? then
|   for $y_{ij} \in Y$ do
|   |   inhibition ← $\Sigma_{kl \in N(ij,r)}$ 1($y_{kl} \geq y_{ij}$)
|   |   $y^*_{ij}$ ← 1(inhibition < sparsity × ||N(ij,r) ||)    // fire if winner
|   Y ← Y*
```

The above example pseudocode provides two options for the decoding, one of which is continuous-valued across the prediction, and the other which is sparse and binary. This is designed to allow the output to match the properties of the corresponding encoder's input (which will often be continuous for the bottom layer and sparse for upper layers). Clearly this is just one choice for producing an appropriate prediction, and variations may be employed as the task demands.

The decoding to a sparse prediction described in the example pseudocode above uses local inhibition in similar manner to the encoder described above. Similarly, variations on this choice of imposition of sparsity may be used for the decoder's prediction.

Prediction Errors are used in the hierarchy to drive local learning, both in the encoder and decoder. First, a target is computed, and compared with the prediction to generate a raw prediction error $E_Y$ in the input space of each layer. This is then used to compute an encoder hidden state error $E_Z$ which is an estimate of the errors in the encoder output.

---
Procedure hierarchyErrors(inputs)
---
Data: input image X
Result: prediction errors $E_Y$, hidden errors $E_Z$
for each layer l do
  | if bottom layer then targets ← X
  | else targets ← D
  | $E_Y$ ← targets − $\overline{Y}$     // elementwise
  ⌊ $E_Z$ ← propagateErrors($E_Y$, $\overline{E}_Z$, $W_{lat}$, $r_{lat}$)
---

It will be clear that this is one of many possible ways to compute prediction errors, and that other choices may be made depending on the embodiment.

propagateErrors reverses the decoding transformation to derive the errors in the encoder hidden states.

---
Procedure propagateErrors(predictionErrors, hiddenErrors)
---
Data: prediction errors $E^Y$, previous hidden errors $\overline{E}^Z$, prediction weights $W_{lat}$, prediction radius $r_{lat}$
Result: new hidden errors $E^Z$
for $\epsilon_{ij}^Z \in E^Z$ do
  | $(k_0, l_0)$ ← projection$_{Z \to Y}$(i, j)
  ⌊ $\epsilon_{ij}^Z$ ← $\overline{\epsilon}_{ij}^Z$ + $\Sigma_{kl \in N(k0,l0,r)} \epsilon_{kl}^Y w_{klij}$
---

This example pseudocode effectively reverses the decoder's processing of lateral encoder outputs, in order to generate an error vector in the encoding space. It uses a process which is analogous to that used in decodeKernel, namely weighted sums over neighbourhoods, using the same encoding matrix $W_{lat}$ (transposed). This reverse process may be varied as appropriate to correspond to that used in the forward version.

Learning in the hierarchy involves using the prediction errors and the decoder inputs (hidden states or feedback) to update decoder weights, and a Spike-time Dependent Plasticity (STDP)-like rule to update the encoding weights.

---
Procedure hierarchyLearn
---
for each layer l do
  | if top layer then $\overline{Y}_{fb}$ ← Z
  | else $\overline{Y}_{fb}$ ← $\overline{Y}_{l+1}$
  | if layer predictive? then
  |   | $W_{fb}$ ← learnDecoder ($E_Y$, $\overline{Y}_{fb}$, $\overline{W}_{fb}$, $\alpha_{fb}$)
  | ⌊ $W_{lat}$ ← learnDecoder ($E_Y$, $\overline{Z}$, $\overline{W}_{lat}$, $\alpha_{lat}$)
  | if layer for input then
  | ⌊ $W_{enc}$ ← learnEncoder(S, $E_Z$, Z, $\overline{D}$, $\overline{W}_{enc}$, $\alpha_{enc}$)
  ⌊ B ← learnBiases(S, $\overline{B}$, $\alpha_{bias}$)
--- learnDecoder updates the decoder weights by combining the prediction error on the output with the input to that weighted connection.

---
Procedure learnDecoder(predErrors, prevInputs, weights, α)
---
Data: prediction error $E^Y$, inputs $\overline{Z}$, weights $\overline{W}$, decay α
Result: new prediction weights W
for $w_{ijkl} \in W$ do
  ⌊ $w_{ijkl}$ ← $\overline{w}_{ijkl}$ + $\alpha \epsilon_{kl}^Y \overline{z}_{ij}$
--- learnEncoder uses a STDP-like mechanism to update the encoder weights, combining the hidden errors, the hidden state, and the derived inputs at each end of the weight's connection. The second component of the weights tensor is a trace of past correlations of hidden states and inputs. The factor scale uses the second component of the stimulus tensor, which is the squared norm of the incoming encoder weights.

---
Procedure learnEncoder(stimuli, errors, states, derived, W, α)
---
Data: stimulus S, hidden errors $E^Z$, hidden states Z, derived input $\overline{D}$, weights $\overline{W}_{enc}$, $\alpha_{enc}$
Result: new encoder weights W
for $w_{ijkl} \in W$ do
  | scale ← $\dfrac{1}{\sqrt{\max(10^{-4}, s_{kl}^2)}}$
  | $w_{ijkl}^1$ ← $\overline{w}_{ijkl}^1$ ∗ scale + $\alpha \epsilon_{kl}^Z z_{kl}(\overline{d}_{ij}^1 - \overline{d}_{ij}^2)$
  ⌊ $w_{ijkl}^2$ ← $\overline{w}_{ijkl}^2$ ∗ γ + (1 − γ)$z_{kl}(\overline{d}_{ij}^1 - \overline{d}_{ij}^2)$   // trace
---

The biases may be updated in several manners, in a way such that the states of a unit have a desired lifetime sparsity. One such method is to updated the biases such that the average stimulus received by a unit approaches zero.

---
Procedure learnBiases(S, $\overline{B}$, $\alpha_{bias}$)
---
Data: stimulus S, previous biases $\overline{B}$, $\alpha_{bias}$
Result: updated biases B
for $b_{ij} \in B$ do
  ⌊ $b_{ij}$ ← $(1 - \alpha)\overline{b}_{ij} - \alpha s_{ij}$
---

The above learning rules represent a typical embodiment. Depending on the task, other embodiments may adapt these rules or use alternative rules. The pseudocode is provided only as an example, and a reader skilled in the art will understand that the system can be implemented in any modern computer language, depending on the platform and performance characteristics of relevance. For example, the system has been built and operated in C++, Go and Java as well as Python, and run on CPU and CPU/GPU systems.

Routed Predictive Hierarchy Processing

The following describes another class of embodiment of the invention, which is denoted as a Routed Predictive Hierarchy. This variation differs from the aforementioned in that encoders and decoders interact through modulation as opposed to error propagation. The encoders in what follows are trained separately from the decoding phase, and the decoding phase consists of a decoder network whose states are modulated by the encoders. This causes the encoders to choose sub-networks for the decoder network, simplifying training and more importantly adding spatiotemporal context to predictions.

simStep(inputs, learn) runs the hierarchy encoding and decoding passes, generates predictions and performs learning optionally.

---
Procedure simStep(inputs, learn?)
---
Data: image inputs, learning control learn
begin
  | hierarchyEncode(inputs)
  | hierarchyPredict(encoder States)
  ⌊ if learn? then hierarchyLearn(inputs)
--- encode( ) pass input into the hierarchy, and runs the up-pass for each layer.

---
Procedure hierarchyEncode (inputs)
---
Data: image inputs
begin
| if whiten then inputs ← whiten(inputs)
| visibles ← inputs
| foreach encoderLayer l do
| | l.states ← l.activate(visibles, λ)
| | visibles ← l.states
--- activate( ) and its kernels pass the hierarchy's inputs up from layer to layer.

---
Procedure activate(visibles, λ)
---
Data: visible input X, previous $\overline{D}$, biases B, weights $W_{enc}$, decay λ
Result: derived input D, stimulus S, hidden states Z
begin
| D ← deriveInputKernel (X, $\overline{D}$, λ)      // derived input
| S ← encodeKernel(D, $\overline{S}$, $W_{enc}$, r)  // compute stimulus
| Z ← solveHiddenKernel(S + B,                       // compute hidden states
$r_{inhibit}$)
--- deriveInputKernel produces a pair of inputs to the encoder, one a copy of the input and the other a moving average of recent inputs.

---
Procedure deriveInputKernel(inputs, outputsPrev, λ)
---
Data: visible inputs X, previous output $\overline{D}$, decay λ
Result: derived output D, $d_{ij}^1$ is the input copied, $d_{ij}^2$ is decayed
for $x_{ij} \in X$ do
| $d_{ij}^1 \leftarrow x_{ij}$
| $d_{ij}^2 \leftarrow \lambda \overline{d}_{ij}^2 + (1 - \lambda)x_{ij}$    // decay previous
--- encodeKernel produces the encoder's stimulus, which is a weighted sum of each unit's derived inputs.

---
Procedure encodeKernel(derivedInput, prevStimulus, weights, radius)
---
Data: derived inputs D, previous stimulus $\overline{S}$, weights $W_{enc}$, window radius r
Result: new stimulus S
for $\overline{s}_{ij} \in \overline{S}$ do
| $(k_0, l_0) \leftarrow$ projection$_{S \rightarrow D}$(i, j)
| $s_{ij}^1 \leftarrow s_{ij}^{-1} + \Sigma_{kl \in N(k_0, l_0, r)} W_{ijkl} (d_{kl}^1 - d_{kl}^2)$
--- solveHiddenKernel implements local inhibition on the activations to produce a sparse binary hidden state.

---
Procedure solveHiddenKernel(activations, radius)
---
Data: activations A, radius r
Result: new hidden states Z
for $a_{ij} \in A$ do
| inhibition ← $\Sigma_{kl \in N(ij,r)} 1(a_{kl} \geq a_{ij})$
| $z_{ij} \leftarrow$ 1(inhibition ≤ sparsity × ||N(ij, r)||)    // fire if winner
--- hierarchyPredict( ): The previously stated algorithms comprise the encoder section of the Routed Predictive Hierarchy. The prediction is handled by a standard feed-forward deep neural network, with the caveat that the activations are modulated by the states of the encoder portion of the system. This prediction network is trained via backpropagation or other means while taking into account the modulating states Z from the encoder hierarchy. This modulation forms subnetworks of the predictor network that are specific to a spatiotemporal state, allowing for improved generalization capabilities as well as fast online training. As the modulation introduces a nonlinearity into the system, the predictor network can be a linear function approximator, simplifying the credit assignment problem due to lack of a vanishing gradient.

An example embodiment is one which uses for decoding a standard feedforward deep neural network operated upside down (from upper layers towards the input layer). The following describes how decoding is performed in this embodiment. Decoding information passes down the hierarchy, as each layer generates predictions by decoding its input from higher layer decoder predictions, modulated by its encoder's hidden states (ie $z_{ij}^{mod} \leftarrow z_{ij}^{fb} z_{ij}$).

---
Procedure hierarchyPredict
---
Result: prediction $Y_l$ for each layer
for each layer l in reverse order do
| if not top layer then $Z_{fb} \leftarrow Y_{l+1}$
| else $Z_{fb} \leftarrow$ Z
| if l predicts then
| | $Z_{mod} \leftarrow Z_{fb} \odot$ Z    // modulate (multiply elementwise)
| | $Y_l \leftarrow$ decodeKernel($Z_{mod}$, $B_{fb}$, $W_{fb}$, $r_{fb}$)
--- decodeKernel transforms the modulated feedback inputs to the decoder using a weight matrix, adding biases, and forming a partial prediction via an optional nonlinearity (defaults to the identity function).

---
Procedure decodeKernel(source, biases, weights, radius)
---
Data: source Z, biases B, weights $W_{lat}$, window radius r
Result: predictions Y
for $y_{ij} \in Y$ do
| $(k_0, l_0) \leftarrow$ projection$_{Y \rightarrow Z}$(i, j)
| $y_{ij} \leftarrow$ nonlinearity($b_{ij} + \Sigma_{kl \in N(k_0, l_0, r)} z_{kl} w_{ijkl}$)
--- hierarchyLearn runs the learning for each layer's encoder.

---
Procedure hierarchyLearn
---
for each layer l do
| if top layer then $\overline{Y}_{fb} \leftarrow$ Z
| else $\overline{Y}_{fb} \leftarrow \overline{Y}_{l+1}$
| if layer for input then
| | $W_{enc} \leftarrow$ learnEncoder(S, $E_Z$, Z, $\overline{D}$, $\overline{W}_{enc}$, $\alpha_{enc}$)
| | B ← learnBiases(S, $\overline{B}$, $\alpha_{bias}$)
---

Learning the encoders is performed using a form of STDP.

---
Procedure learnEncoder(stimuli, errors, states, derived, W, α)
---
Data: stimulus S, hidden states Z, derived input $\overline{D}$, weights $\overline{W}_{enc}$, $\alpha_{enc}$
Result: new encoder weights W
for $w_{ijkl} \in W$ do
| $w_{ijkl} \leftarrow \overline{w}_{ijkl} + \alpha \epsilon_{kl}^Z z_{kl} [(\overline{d}_{ij}^1 - \overline{d}_{ij}^2) - w_{ijkl}]$
---

In the following embodiment of the bias update rule, we achieve lifetime sparsity in the state of a unit by incrementing the bias when the state is too low (average below the target sparsity), and proportionally decrementing it when the state is too high (average above the target sparsity).

---
Procedure learnBiases(S, $\overline{B}$, $\alpha_{bias}$)
---
Data: state Z, previous biases $\overline{B}$, $\alpha_{bias}$
Result: updated biases B
for $b_{ij} \in B$ do
  | $b_{ij} \leftarrow \overline{b}_{ij} + \alpha(\text{sparsity} - z_{ij})$
---

This ends the description of the Routed Predictive Hierarchy.

Combining with Reinforcement Learning

The aforementioned embodiments, as well as the architecture in general, lend themselves to combination with reinforcement learning (RL). With the addition of reinforcement learning, the resulting agent can learn and act upon its environment. The Routed Predictive Hierarchy in particular is well-suited to reinforcement learning due to the ease of combining additional networks through state modulation.

To achieve this, the Routed Predictive Hierarchy may be incorporated in a reinforcement learning focused embodiment by using the encoder hierarchy to modulate a collection (or "swarm") of small reinforcement learning agents. Each visible state is paired with a small reinforcement learning agent whose actions are modulated by the encoders. As a result each spatiotemporal state creates a different ensemble of small reinforcement learning agents. The agents produce actions which are either treated as action outputs, or are fed in as input to the next lower layer agents. This creates a form of hierarchical reinforcement learning.

Such reinforcement learners, as with a prediction network, are trained online with the help of the modulatory encoder hidden states. This also allows one to easily use eligibility traces to improve learning speed. The underlying algorithm behind each agent in the ensemble can vary between implementations as well as within individual layers in order to better encompass the task at hand.

A simpler but more limited embodiment uses an encoder-modulated feed forward backpropagation network to learn Q values for different actions. However, this method doesn't readily exploit hierarchical action selection or continuous (or discrete approximations of continuous) actions. Though less powerful, it may be more suitable if the surrounding apparatus requires such a design.

It will be clear to those skilled in the art that the Routed Predictive Hierarchy may be used not only in the various embodiments and configurations described herein, but in combination with and acting as a spatiotemporally-aware controller and modulator for learning systems of any kind.

Specialized Encoders

The operation of a system based on the Sparse Predictive Hierarchy or Routed Predictive Hierarchy may, as previously described, be enhanced for certain tasks by replacing some encoder/decoder modules with variants which are more suitable for the task. Here we describe a class of embodiments which incorporates two such variant modules, designed for systems which, for example, detect anomalous objects in a video stream.

The first variant module is denoted the Binary Iterative Shrinkage-Thresholding Algorithm (BISTA) encoder. It learns to produce a sparse binary code for a high-dimensional continuous-valued bottom-layer input frame which can be directly decoded by the decoder component. This provides sparse codes for higher layers, at the cost of some iteration in the bottom layer only.

The second variant module is called the Spike Propagation (SpikeProp) encoder. It is a variation on the Delay Encoder as described above. As will be described, the SpikeProp encoder uses the actual sparse binary input (usually from a lower encoder), backpropagated through the decoder transformation, to produce a target spike pattern for the encoder hidden layer, and this target is used to drive STDP learning instead of the actual hidden output (and transformed prediction error) as used in the Delay Encoder described earlier.

The BISTA encoder activate( ) and its kernels pass the hierarchy's inputs up from layer to layer. Each step around the iterative solver, the previous spike pattern is used to generate a reconstruction of the input. The reconstruction error $E_{recon}$ forms the input to generate new stimuli S, which are then used to generate activations A, and those are inhibited to generate the new spike pattern.

---
Procedure activate(visibles, $\lambda$)
---
Data: visible input X, previous $\overline{D}$, biases B, weights $W_{enc}$, decay $\lambda$
Result: derived input D, stimulus S, hidden states Z
begin
  | D $\leftarrow$ deriveInputKernel(X, $\overline{D}$, $\lambda$)  // derived input
  | $\hat{Z} \leftarrow \overline{Z}$, S $\leftarrow$ 0, A $\leftarrow \overline{A}$
  | for $n_{iter}$ iterations do
  |  | $E_{recon} \leftarrow$ reverseKernel(D, $\hat{Z}$, $W_{enc}$, r)
  |  | S $\leftarrow$ encodeKernel ($E_{recon}$, S, $W_{enc}$, r)  // compute stimulus
  |  | A $\leftarrow$ activateKernel(S, $\Theta$, A, $\lambda$, $\rho$)  // compute activations
  |  | $\hat{Z} \leftarrow$ solveHiddenKernel(A, $r_{inhibit}$)  // compute hidden
  | Z $\leftarrow \hat{Z}$                                        states
  | $E_{recon} \leftarrow$ reverseKernel(D, Z, $W_{enc}$, r)
--- deriveInputKernel produces a pair of inputs to the encoder, one a copy of the input and the other a moving average of recent inputs.

---
Procedure deriveInputKernel(inputs, outputsPrev, $\lambda$)
---
Data: visible inputs X, previous output $\overline{D}$, decay $\lambda$
Result: derived output D, $d_{ij}^1$ is the input copied, $d_{ij}^2$ is decayed
for $x_{ij} \in X$ do
  | $d_{ij}^1 \leftarrow x_{ij}$
  | $d_{ij}^2 \leftarrow \lambda \overline{d}_{ij}^2 + (1 - \lambda)x_{ij}$  // decay previous
--- reverseKernel calculates the current reconstruction error given the current hidden solution and the derived inputs.

---
Procedure reverseKernel(inputs, prevHidden, weights, radius)
---
Data: derived inputs D, previous hidden solution Z, weights $W_{enc}$, window radius r
Result: reconstruction error $E_{recon}$
for $\epsilon_{ij} \in E_{recon}$ do
  | $(k_0, l_0) \leftarrow$ projection$_{D \to Z}(i, j)$
  | $\epsilon_{ij} \leftarrow \overline{d}_{ij}^1 - \Sigma_{kl \in N(k_0, l_0, r)} z_{kl} w_{klij}$
--- encodeKernel produces the encoder's stimulus, which is a weighted sum of each unit's input reconstruction errors.

---
Procedure encodeKernel(reconError, prevStimulus, weights, radius)
---
Data: reconstruction error $E_{recon}$, previous stimulus $\overline{S}$, weights $w_{enc}$, window radius r
Result: new stimulus S -continued ---
Procedure encodeKernel(reconError, prevStimulus, weights, radius)
---
for $\bar{s}_{ij} \in \bar{S}$ do
| $(k_0, l_0) \leftarrow \text{projection}_{S \to E}(i, j)$
| $s_{ij}^1 \leftarrow \bar{s}_{ij}^1 + \Sigma_{kl \in N(k_0,l_0,r)} \epsilon_{kl} w_{ijkl}$
--- activateKernel produces the encoder's activations from the stimulus.

---
Procedure activateKernel(stimulus, thresholds, prevActivations, γ, ρ)
---
Data: stimulus S, thresholds Θ, previous activations $\bar{A}$, decay γ, solve rate ρ
Result: new activations A
for $a_{ij} \in A$ do
| $a_{ij} \leftarrow \gamma \bar{a}_{ij} + \rho(s_{ij} - \theta_{ij})$
--- solveHiddenKernel implements local inhibition on the activations to produce a sparse binary hidden state.

---
Procedure solveHiddenKernel(activations, radius)
---
Data: activations A, radius r
Result: new hidden states Z
for $a_{ij} \in A$ do
| inhibition $\leftarrow \Sigma_{kl \in N(ij,r)} 1(a_{kl} \geq a_{ij})$
| $z_{ij} \leftarrow 1(\text{inhibition} \leq \text{sparsity} \times \|N(ij,r)\|)$    // fire if winner
---

The result of the iterative solving is a sparse code which represents a number of steps towards the minimisation of reconstruction errors of the encoder.

Learning in the BISTA encoder is performed using a form of reconstruction error minimisation.

---
Procedure learnEncoder(errors, states, W, α)
---
Data: hidden states Z, reconstitution error $E_{recon}$, weights $\overline{W}_{enc}$, $\alpha_{enc}$
Results: new encoder weights W
for $w_{ijkl} \in W$ do
| $w_{ijkl} \leftarrow \overline{w}_{ijkl} + \alpha \epsilon_{ij} w_{ijkl} z_{kl}$
---

In the following embodiment of the threshold update rule, we achieve lifetime sparsity in the state of a unit by incrementing the threshold when the state is too low (average below the target sparsity), and proportionally decrementing it when the state is too high (average above the target sparsity).

---
Procedure learnThresholds(Z, $\overline{\Theta}$, $\alpha_\theta$, sparsity)
---
Data: state Z, previous thresholds Θ, $\alpha_\theta$, sparsity
Result: updated thresholds Θ
for $\theta_{ij} \in \Theta$ do
| $\theta_{ij} \leftarrow \overline{\theta}_{ij} + \alpha(z_{ij} - \text{sparsity})$
---

Once the BISTA encoder has produced a sparse binary encoding of its input, the remainder of the hierarchy uses the SpikeProp encoders. encodeHierarchy( ) pass input into the hierarchy, and run the up-pass for each layer. First, the BISTA layer converts the inputs into a sparse binary hidden state, and then each successive layer builds its representation.

---
Procedure encodeHierarchy(inputs)
---
Data: image inputs
Result:
begin
| if whiten then inputs ← whiten(inputs)
| visibles ← bistaLayer.activeEncoder(inputs)
| foreach upper layer l do
| | visibles ← l.activateEncoder(visibles, λ)
---

The activateEncoder( ) and its kernels pass the hierarchy's inputs up from layer to layer. The encoding and decoding are combined.

---
Procedure acrtivateEncoder(visibles, λ)
---
Data: visible input X, previous $\overline{D}$, biases B, weights $W_{enc}$, decay λ, pooling $\beta_{pool}$
Result: derived input D, stimulus S, activations A, hidden states Z
begin
| D ← deriveInputKernel(X, $\overline{D}$, λ)         // derived input
| if layer used for input then
| | S ← encodeKernel(D, $\bar{S}$, $W_{enc}$, r)    // compute stimulus
| A ← activateKernal(S, $\bar{A}$, $\bar{Z}$)        // compute acvtivations
| Z ← solveHiddenKernel(A, $r_{inhibit}$)            // compute hidden states
| Y ← decodeKernal(Z, $W_{lat}$, $r_{lat}$)          // decor prediction
--- deriveInputKernel produces a pair of inputs to the encoder, one a copy of the input and the other a moving average of recent inputs.

---
Procedure deriveInputKernal(inputs, outputsPrev, λ)
---
Data: visible inputs X, previous output $\overline{D}$, decay λ
Result: derived output D, $d_{ij}^1$ is the input copied, $d_{ij}^2$ is decayed
for $x_{ij} \in X$ do
| $d_{ij}^1 \leftarrow x_{ij}$
| $d_{ij}^2 \leftarrow \lambda \overline{d}_{ij}^2 + (1 - \lambda) x_{ij}$   // decay previous
--- encodeKernel produces the encoder's stimulus, which is a weighted sum of each unit's derived inputs.

---
Procedure encodeKernel(derivedInputs, prevStimulus, weights, radius)
---
Data: derived inpus D, previous stimulus $\bar{S}$, weights $W_{enc}$, window radius r
Result: new stimulus S
for $\bar{s}_{ij} \in \bar{S}$ do
| $(k_0, l_0) \leftarrow \text{projection}_{S \to D}(i, j)$
| $s_{ij}^1 \leftarrow \bar{s}_{ij}^1 + \Sigma_{kl \in N(k_0,l_0,r)} (d_{kl}^1 - d_{kl}^2) w_{ijkl}$
| $s_{ij}^2 \leftarrow \bar{s}_{ij}^2 + w_{ijkl}$
--- activateKernel produces the encoder's activations from the stimulus, the previous activations, and the previous states. The activation is constrained nonnegative by a Rectified Linear Unit.

---
Procedure activateKernel(stimuls, prevActivatiobns, prevHidden)
---
Data: stimulus S, previous activations $\bar{A}$ and hidden states $\bar{Z}$
Result: new activations A
for $a_{ij} \in A$ do
| $a_{ij} \leftarrow \max(0, \bar{a}_{ij}(1 - \bar{z}_{ij}) + s_{ij})$
--- solveHiddenKernel implements local inhibition on the activations to produce a sparse binary hidden state.

| Procedure solveHiddenKernel(activations, radius) |
|---|
| Data: activations A, radius r |
| Result: new hidden states Z |
| for $a_{ij} \in A$ do |
| $\quad$ inhibition $\leftarrow \Sigma_{kl \in N(ij,r)} 1(a_{kl} \geq a_{ij})$ |
| $\quad z_{ij}^1 \leftarrow 1(\text{inhibition} \leq \text{sparsity} \times \|N(ij, r)\|)$ $\quad$ // fire if winner |
| $\quad z_{ij}^2 \leftarrow \max(\gamma \overline{z}_{ij}^2, z_{ij}^1)$ $\quad$ // firing trace | decodeKernel transforms the hidden inputs to the decoder using a weight matrix, forming a partial prediction.

| Procedure decodeKernel(source, weights, radius) |
|---|
| Data: source Z, weights $W_{lat}$, window radius r |
| Result: predictions Y |
| for $y_{ij} \in Y$ do |
| $\quad (k_0, l_0) \leftarrow \text{projection}_{Y \to Z}(i, j)$ |
| $\quad y_{ij} \leftarrow \Sigma_{kl \in N(k_0,l_0,r)} z_{kl} w_{ijkl}$ | hierarchyLearn runs the learning for each layer's encoder.

| Procedure hierarchyLearn |
|---|
| for each layer l do |
| $\quad E_Y \leftarrow \overline{Y} - D^1$ $\quad$ // prediction error |
| $\quad \hat{S}_{prop} \leftarrow \text{propagateInputs}(X, W_{lat}, r_{lat})$ $\quad$ // propagate inputs |
| $\quad \hat{T} \leftarrow \text{solveHiddenKernel}(\hat{S}_{prop}, r_{inhibit})$ $\quad$ // target hidden states |
| $\quad \hat{S} \leftarrow \text{stimulusKernel}(X, W_{enc}, r)$ $\quad$ // stimulus due to raw input |
| $\quad \hat{Z} \leftarrow \text{solveHiddenKernel}(\hat{S}, r_{inhibit})$ $\quad$ // hidden states due to input |
| $\quad$ if layer for input then |
| $\quad\quad W_{enc} \leftarrow \text{learnEncoder}(S, D, \overline{Z}, \hat{Z}, \hat{T}, \overline{T}, \overline{W}_{enc}, \alpha_{enc}, \gamma)$ |
| $\quad W_{lat} \leftarrow \text{learnDecoder}(E_Y, \overline{Z}, \overline{W}_{lat}, \alpha_{lat})$ |
| $\quad B \leftarrow \text{learnBiases}(S, \overline{B}, \alpha_{bias})$ | propagateInputs reverses the decoding transformation to derive the stimulus for spike propagation.

| Procedure propagateInputs(inputs, weights, radius) |
|---|
| Data: inputs X, prediction weights $W_{lat}$, prediction radius $r_{lat}$ |
| Result: propagated stimulus $\hat{S}_{prop}$ |
| for $s_{ij} \in \hat{S}_{prop}$ do |
| $\quad (k_0, l_0) \leftarrow \text{projection}_{Z \to Y}(i, j)$ |
| $\quad s_{ij} \leftarrow \Sigma_{kl \in N(k_0,l_0,r)} x_{kl} w_{klij}$ | stimulusKernel computes the stimulus due to the raw inputs.

| Procedure stimulusKernel(inputs, weights, radius) |
|---|
| Data: inputs X, weights $W_{enc}$, window radius r |
| Result: input stimulus $\hat{S}$ |
| for $\hat{s}_{ij} \in \hat{S}$ do |
| $\quad (k_0, l_0) \leftarrow \text{projection}_{S \to D}(i, j)$ |
| $\quad \hat{s}_{ij} \leftarrow \Sigma_{kl \in N(k_0,l_0,r)} x_{kl} w_{ijkl}$ | learnEncoder uses a STDP-like mechanism to update the encoder weights, using the hidden state due to the input at each end of the weight's connection.

| Procedure learnEncoder(S, D, $\overline{Z}$, $\hat{Z}$, $\hat{T}$, T, $\overline{W}_{enc}$, $\alpha_{enc}$, $\gamma$) |
|---|
| Data: stimulus S, derived inputs D, previous hidden states $\overline{Z}$, hidden states from input $\hat{Z}$, target hidden state $\hat{T}$, previous targets $\overline{T}$, weights $\overline{W}_{enc}$, $\alpha_{enc}$, $\gamma$ |
| Result: new encoder weights W |

| Procedure learnEncoder(S, D, $\overline{Z}$, $\hat{Z}$, $\hat{T}$, T, $\overline{W}_{enc}$, $\alpha_{enc}$, $\gamma$) |
|---|
| for $w_{ijkl} \in W$ do |
| $\quad$ scale $\leftarrow \dfrac{1}{\sqrt{\max(10^{-4}, s_{kl}^2)}}$ |
| $\quad \Delta_{stdp} \leftarrow \max(0, \hat{z}_{kl}^1 \overline{t}_{kl}^2 - z_{kl}^2 \hat{t}_{kl}^1)$ |
| $\quad w_{ijkl}^1 \leftarrow \overline{w}_{ijkl}^1 * \text{scale} + \alpha \Delta_{stdp} \overline{w}_{ijkl}^2$ |
| $\quad w_{ijkl}^2 \leftarrow \gamma \overline{w}_{ijkl}^2 (1 - \overline{z}_{kl}^1) + (d_{ij}^1 - d_{ij}^2)$ | learnDecoder updates lateral weights.

| Procedure learnDecoder(predErrors, prevInputs, weights, $\alpha$) |
|---|
| Data: prediction error $E^Y$, inputs $\overline{Z}$, weights $\overline{W}$, decay $\alpha$ |
| Result: new prediction weights W |
| for $w_{ijkl} \in W$ do |
| $\quad w_{ijkl} \leftarrow \overline{w}_{ijkl} + \alpha \epsilon_{kl}^Y \overline{z}_{ij}$ |

In the following embodiment of the bias update rule, we achieve lifetime sparsity in the state of a unit by decrementing the bias when the stimulus is too high, and incrementing it when the stimulus is too low.

| Procedure learnBiases(S, $\overline{B}$, $\alpha_{bias}$) |
|---|
| Data: stimulus S, previous biases $\overline{B}$, $\alpha_{bias}$ |
| Result: updated biases B |
| for $b_{ij} \in B$ do |
| $\quad b_{ij} \leftarrow b_{ij} - \alpha s_{ij}$ |

Delay Encoder—Detailed Description

Construction

When the computer begins the execution of the stored program code, each delay encoder is constructed in the memory of the system as follows (for m inputs and n outputs):

1. allocate 1-d arrays of length n for the activations, the previous activations, the output values, the previous outputs, the stimulus, the previous stimulus, the output traces, and the biases. Initialise to zero.
2. allocate 1-d arrays of length m for the inputs, the previous inputs, and the input traces. Initialise to zero.
3. allocate a 2-d n×m array of feedforward weights, output values, initially random and small, and a n×m array of feedforward traces, initially all zero.

For example, in Python:
inputs=zeros1D(numInputs)
inputsPrev=zeros1D(numInputs)
activations=zeros1D(numOutputs)
activationsPrev=zeros1D(numOutputs)
states=zeros1D(numOutputs)
statesPrev=zeros1D(numOutputs)
inputTraces=zeros1D(numInputs)
inputTracesPrev=zeros1D(numInputs)
outputTraces=zeros1D(numOutputs)
outputTracesPrev=zeros1D(numOutputs)
errorTraces=zeros1D(numOutputs)
errorTracesPrev=zeros1D(numOutputs)
stimulus=zeros1D(numOutputs)
stimulusPrev=zeros1D(numOutputs)

biases=zeros1D(numOutputs)
weightsFeedForward=randomUniformRange(numOutputs,
    numInputs, initMinWeight, initMaxWeight)
tracesFeedForward=zeros2D(numOutputs, numInputs))
Typical Parameters
alpha=0.01
beta=0.0
lambda=0.7
gamma=0.8
activeRatio=0.05
Activation In the following, the symbol $\odot$ refers to elementwise multiplication of same-sized vectors or matrices; $\otimes$ refers to an outer product of arbitrary vectors, forming a matrix result. $J_n$ is an n-dimensional vector of all 1's, and $J_{n,m}$ is an n×m-dimensional matrix of all 1's. $W_i$ is the ith row of matrix W.

Calculate the stimulus vector $s \in \mathbb{R}^n$ from the feed-forward weights $W \in \mathbb{R}^{n \times m}$ and input vector $x \in \mathbb{R}^m$:

$$s_t = W x_t$$

Update activation vector a element-wise: preserve only the previous non-active activations, add the stimulus, subtract the biases, and apply a rectified linear unit function (ReLU):

$$a_t = \max(0, (J_n - z_{t-1}) a_{t-1} + s_t - b_{t-1})$$

Choose the top k activation elements:

$$\Gamma_k = \text{supp}_k(a_t)$$

Set the appropriate elements to 1 or 0 to generate the encoder output z:

$$z_t = \delta(i \in \Gamma_k)$$

Determine the exponentially decaying traces of the activities in $x_t$ and $z_t$:

$$\hat{x}_t = \lambda \hat{x}_{t-1} + x_t$$

$$\hat{z}_t = \lambda \hat{z}_{t-1} + z_t$$

Example code (in Python) for activation is as follows:
```
import numpy as np
# Compute the Stimulus of the Hidden Cells
stimulus=np.dot(weightsFeedForward, inputs)
# Determine Cell Activations
activations=np.maximum(0.0,(np.multiply(1.0-statesPrev,
    activations)+stimulus-biases))
# Determine Top K Highest Cell Activations
heap=[ ]
for i in range(0, states.size):
    heapq.heappush(heap, (activations.item(i), i))
nLargest=heapq.nlargest(numActive, heap, key=itemgetter
    (0))
# Inhibition
states=zeros1D(states.size)
for i in range(0, numActive):
    states[nLargest[i][1]]=1.0
# Update Eligibility Traces
inputTraces=gamma*inputTraces+inputs
outputTraces=gamma*outputTraces+states
```

Learning Rule (One Embodiment)

Maintain a trace matrix T for previous activity taking reset into account (derived from Real-Time Recurrent Learning):

$$T_t = \lambda T_{t-1} \odot (J_{n,m} - Z_{t-1}) + X_{t-1}$$

where $Z_{ij}=z_i$, $X_{ij}=x_j$ and $J_{ij}=1$, i=1 ... n, j=1 ... m, when there are n outputs and m inputs.

Determine importance of the feed forward weights:

$$Y_{ij} = e^{w_{ij}}$$

Calculate the importance-weighted spike time dependent plasticity (STDP) value for each connection:

$$P = Y \odot (z_{t-1} \otimes \hat{x}_t - \hat{z}_{t-1} \otimes x_{t-1})$$

Determine the temporal direction using an average of the connection STDPs:

$$d_i = \frac{\sum_j P_{ij}}{\sum_j Y_{ij}}$$

Finally, update the weights:

$$\Delta W_{ij} = \alpha (d_i T_{ij})$$

To improve stability, normalize W such that each node's connection weights sum up to 1:

$$W_{ij} \leftarrow \frac{W_{ij}}{\|W_i\|_2}$$

Update the biases:

$$\Delta b_i = \beta (s_{t-1} - b_{t-1})$$

Example code (in Python) for learning is as follows:
```
tracesFeedForward=lambda *
    np.multiply(
        np.repeat((1.0-statesPrev), numInputs, 1),
        tracesFeedForward)+
    np.repeat(inputsPrev.T, numOutputs, 0)
importances=np.exp(weightsFeedForward)
stdp=np.dot(statesPrev, inputTraces.T)-
    np.dot(outputTraces, inputsPrev.T)
weightedSTDP=np.multiply(importances, stdp)
dirs=np.divide(
    np.sum(weightedSTDP, 1).reshape((numOutputs, 1)),
    np. sum(importances, 1).reshape ((numOutputs, 1)))
weightsFeedForward+=alpha*np.multiply(
    np.repeat(dirs, numInputs, 1), tracesFeedForward)
for i in range(0, numOutputs):
    s=np.sqrt(np.sum(np.square(weightsFeedForward[i, :])))
    weightsFeedForward[i, :]/=s
biases+=beta*(stimulusPrev-biases)
```

The above learning rules represent a typical embodiment. Depending on the task, other embodiments may adapt these rules or use alternative rules. The Python code is provided only as an example, and a reader skilled in the art will understand that the system can be implemented in any modern computer language, depending on the platform and performance characteristics of relevance. For example, the system has been built and operated in C++ and Go as well as Python, and run on CPU and CPU/GPU systems.

Variant Affecting Stability in Delay Encoder

The Delay Encoder described elsewhere may be affected in terms of stability for certain embodiments or tasks as follows:

Calculate the importance-weighted spike time dependent plasticity (STDP) value for each connection:

$$P = Y \odot (z_{t-1} \otimes \hat{x}_t + \hat{z}_{t-1} \otimes x_{t-1})$$

The outer products are added in this embodiment instead of subtracted as in the appendix. The corresponding Python code (Paragraph [30]) is now:
stdp=np.dot(statesPrev, inputTraces.T)+
np.dot(outputTraces, inputsPrev.T)

This change makes the STDP rule operate more symmetrically in time, so that the spiking pattern changes in the direction of the nearest correct output, whether this is backward or forward in time.

Further, the activation update can be modified to remove the non-linearity (max):

$$\alpha_{ij} \leftarrow \gamma_a \bar{a}_{ij}(1-\bar{z}_{ij})+(1-\gamma_a)s_{ij}$$

which results in an activation that is bounded to $s_{ij}$ through a running average with its own decay rate $\gamma_a$.

Detailed Description—Chunk Encoder

The Chunk Encoder is an improved piece of componentry which may be used as a replacement for other encoders in the Predictive Hierarchy as described elsewhere in the instant application. The Chunk Encoder splits its output hidden state layer into small tiles called chunks, which operate as small, semi-independent self-organising representers of the underlying input data. Each chunk chooses a winning cell by inhibition for each timestep, and the weights in the chunk's units are updated to try to follow the winner for the given input.

The primary procedures in the following which govern the operation of the hierarchy are activate and learn.

activate and its kernels pass the hierarchy's inputs up from layer to layer. The input is first combined with its historical values to generate a derived input, and then converted into a stimulus which is the size and shape of the output encoding. The stimulus is combined with each unit's bias to produce the activation (which may include information about previous stimuli), and finally the usually sparse hidden states are computed as the output of the encoder stage.

| Procedure activate(visibles, λ) |
| --- |
| Data: input X, previous $\bar{D}$, biases B, weights $W_{enc}$, decay λ, pooling $\beta_{pool}$ |
| Result: derived input D, stimulus S, activations A, hidden states Z |
| begin |
|    \| $S \leftarrow \bar{B}$                                        // set summation to biases |
|    \| $D \leftarrow$ sfcDeriveInputs(X, $\bar{D}$, λ)            // derived input |
|    \| $P \leftarrow$ sfcAddSample(D, $\bar{P}$, $n_{sample}$)      // shifted samples |
|    \| if layer used for input then |
|    \| $S \leftarrow$ sfcStimulus(P, $\bar{S}$, $W_{enc}$, r, $r_{chunk}$, $n_{sample}$) // compute stimulus |
|    \| $A \leftarrow$ sfcActivate(S, $\bar{Z}$)             // compute activations |
|    \| $(Z, Z_{chunk}) \leftarrow$ sfcInhibit(A, $\bar{Z}$, r, $r_{chunk}$) // compute chunk winners |

The following listings contain example OpenCL kernel code for the Chunk Encoder.

```
void kernel sfcDeriveInputs(read_only image2d_t inputs,
    read_only image2d_t outputsBack,
    write_only image2d_t outputsFront, float lambda) {
    int2 position=(int2)(get_global_id(0), get_global_id(1));
    float input=read_imagef(inputs, defaultSampler,
        position).x;
    float tracePrev=read_imagef(outputsBack, defaultSampler, position).y;
    write_imagef(outputsFront, position, (float4)(input-tracePrev,
        lambda*tracePrev+(1.0f-lambda)*input, 0.0f, 0.0f));
}
```
Listing 1: sfcDeriveInputs transforms the input into a delta of the input and previous trace, and a new trace value, a running average of previous inputs.

```
void kernel sfcAddSample(read_only image2d_t visibleStates,
    read_only image3d_t samplesBack, write_only image3d_t samplesFront,
    int numSamples)
{
    int2 position = (int2)(get_global_id(0), get_global_id(1));
    float visibleState = read_imagef(visibleStates, defaultSampler,
        position).x;
    for (int s = 1; s < numSamples; s++) {
        float samplePrev = read_imagef(samplesBack, defaultSampler,
            (int4)(position.x, position.y, s - 1, 0)).x;
        write_imagef(samplesFront, (int4)(position.x, position.y, s, 0),
            (float4)(samplePrev, 0.0f, 0.0f, 0.0f));
    }
    write_imagef(samplesFront, (int4)(position.x, position.y, 0, 0),
        (float4)(visibleState, 0.0f, 0.0f, 0.0f));
}
```
Listing 2: sfcAddSample makes a shifted copy of the samples tensor samplesBack and adds the new input from visibleState at index 0, placing the result in samplesFront.

```
void kernel sfcStimulus(read_only image3d_t samples,
    read_only image2d_t hiddenSummationTempBack,
    write_only image2d_t hiddenSummationTempFront,
    read_only image3d_t weights,
    int2 visibleSize, float2 hiddenToVisible, int2 chunkSize,
    float2 chunksToHidden, int radius, int numSamples, uchar ignoreMiddle)
{
    int2 hiddenPosition = (int2)(get_global_id(0), get_global_id(1));
    int2 chunkPosition = (int2)(hiddenPosition.x / chunkSize.x,
        hiddenPosition.y / chunkSize.y);
    float2 chunkCenterf = ((float2)(chunkPosition.x, chunkPosition.y) +
        (float2)(0.5f)) * chunksToHidden;
    int2 chunkCenter = (int2)(chunkCenterf.x, chunkCenterf.y);
    int2 visiblePositionCenter = project(chunkCenter, hiddenToVisible);
    float sum = read_imagef(hiddenSummationTempBack, defaultSampler,
        hiddenPosition).x;
    float subSum = 0.0f;
    float count = 0.0f;
    int2 fieldLowerBound = visiblePositionCenter - (int2)(radius);
    for (int s = 0; s < numSamples; s++) {
        for (int dx = -radius; dx <= radius; dx++)
            for (int dy = -radius; dy <= radius; dy++) {
                int2 visiblePosition = visiblePositionCenter + (int2)(dx, dy);
                if (ignoreMiddle && dx == 0 && dy == 0)
                    continue;
                if (inBounds0(visiblePosition, visibleSize)) {
                    int2 offset = visiblePosition - fieldLowerBound;
                    int wi = s + numSamples *
                        (offset.y + offset.x * (radius * 2 + 1));
                    float weight = read_imagef(weights, defaultSampler,
                        (int4)(hiddenPosition.x, hiddenPosition.y, wi, 0)).x;
                    float sample = read_imagef(samples, defaultSampler,
                        (int4)(visiblePosition.x, visiblePosition.y, s, 0)).x;
                    float delta = sample - weight;
                    subSum += -delta * delta;
                    count += 1.0f;
                }
            }
    }
    write_imagef(hiddenSummationTempFront, hiddenPosition,
        (float4)(sum + subSum / fmax(0.0001f, count), 0.0f, 0.0f, 0.0f));
}
```
Listing 3: sfcStimulus computes the stimulus hiddenSummationTempFront by taking a window of inputs from visibleStates, subtracting a weight (taken from weights) from each input, and summing the squares. The result is normalised to the count of inputs, exponentiated and added to the previous stimulus.

```
void kernel sfcActivate(read_only image2d_t hidden-
    Stimuli,
    read_only image2d_t hiddenStatesPrev,
    write_only image2d_t hiddenActivationsFront)
{
    int2 hiddenPosition=(int2)(get_global_id(0), get_glo-
        bal_id(1));
    float       hiddenStimulus=read_imagef(hiddenStimuli,
        defaultSampler, hiddenPosition).x;
    write_imagef(hiddenActivationsFront,    hiddenPosition,
        (float4)(exp(hiddenStimulus), 0.0f, 0.0f, 0.0f));
}
```

Listing 4: sfcActivate calculates the activations by adding the stimulus to the bias for each unit.

```
void kernel sfcInhibit(read_only image2d_t activations,
    write_only image2d_t hiddenStatesFront,
    write_only image2d_t chunkWinners,
    int2 hiddenSize, int2 chunkSize)
{
    int2 chunkPosition = (int2)(get_global_id(0), get_global_id(1));
    int2 hiddenStartPosition = chunkPosition * chunkSize;
    float maxValue = -99999.0f;
    int2 maxDelta = (int2)(0);
    for (int dx = 0; dx < chunkSize.x; dx++)
        for (int dy = 0; dy < chunkSize.y; dy++) {
            int2 hiddenPosition = hiddenStartPosition + (int2)(dx, dy);
            if (inBounds0(hiddenPosition, hiddenSize)) {
                float activation = read_imagef(activations, defaultSampler,
                    hiddenPosition).x;
                if (activation > maxValue) {
                    maxValue = activation;
                    maxDelta = (int2)(dx, dy);
                }
            }
        }
    write_imagei(chunkWinners, chunkPosition,
        (int4)(maxDelta.x, maxDelta.y, 0, 0));
    for (int dx = 0; dx < chunkSize.x; dx++)
        for (int dy = 0; dy < chunkSize.y; dy++) {
            int2 hiddenPosition = hiddenStartPosition + (int2)(dx, dy);
            if (inBounds0(hiddenPosition, hiddenSize)) {
                //float tracePrev = read_imagef(hiddenStatesBack,
                    defaultSampler, hiddenPosition).y;
                if (dx == maxDelta.x && dy == maxDelta.y)
                    write_imagef(hiddenStatesFront, hiddenPosition,
                        (float4)(1.0f, 0.0f, 0.0f, 0.0f));
                else
                    write_imagef(hiddenStatesFront, hiddenPosition,
                        (float4)(0.0f, 0.0f, 0.0f, 0.0f));
            }
        }
}
```

Listing 5: sfcInhibit performs chunk-wise inhibition for each activation

```
void kernel sfcInhibitOther(read_only image2d_t activations,
    write_only image2d_t hiddenStatesFront,
    int2 hiddenSize, int2 chunkSize)
{
    int2 chunkPosition = (int2)(get_global_id(0), get_global_id(1));
    int2 hiddenStartPosition = chunkPosition * chunkSize;
    float maxValue = -99999.0f;
    int2 maxDelta = (int2)(0);
    for (int dx = 0; dx < chunkSize.x; dx++)
        for (int dy = 0; dy < chunkSize.y; dy++) {
            int2 hiddenPosition = hiddenStartPosition + (int2)(dx, dy);
            if (inBounds0(hiddenPosition, hiddenSize)) {
                float activation = read_imagef(activations, defaultSampler,
                    hiddenPosition).x;
                if (activation > maxValue) {
                    maxValue = activation;
                    maxDelta = (int2)(dx, dy);
                }
            }
        }
    for (int dx = 0; dx < chunkSize.x; dx++)
        for (int dy = 0; dy < chunkSize.y; dy++) {
            int2 hiddenPosition = hiddenStartPosition + (int2)(dx, dy);
            if (inBounds0(hiddenPosition, hiddenSize)) {
                if (dx == maxDelta.x && dy == maxDelta.y)
                    write_imagef(hiddenStatesFront, hiddenPosition,
                        (float4)(1.0f, 0.0f, 0.0f, 0.0f));
                else
                    write_imagef(hiddenStatesFront, hiddenPosition,
                        (float4)(0.0f, 0.0f, 0.0f, 0.0f));
            }
        }
}
```

Listing 6: sfcInhibitOther performs chunk-wise inhibition on the encoder output states.

```
void kernel sfcReconstruct(read_only image2d_t hiddenStates,
    read_only image2d_t hiddenActivations, write_only image3d_t recons,
    read_only image3d_t weights, int2 visibleSize, int2 hiddenSize,
    float2 visibleToHidden, float2 hiddenToVisible, int2 chunkSize,
    float2 chunksToHidden, int radius, int2 reverseRadii, int numSamples)
{
    int2 visiblePosition = (int2)(get_global_id(0), get_global_id(1));
    int2 hiddenPositionCenter = project(visiblePosition, visibleToHidden);
    // Find chunks for this input
    for (int s = 0; s < numSamples; s++) {
        float recon = 0.0f;
        for (int dx = -reverseRadii.x; dx <= reverseRadii.x; dx++)
            for (int dy = -reverseRadii.y; dy <= reverseRadii.y; dy++) {
                int2 hiddenPosition = hiddenPositionCenter + (int2)(dx, dy);
                if (inBounds0(hiddenPosition, hiddenSize)) {
                    int2 chunkPosition = (int2)(hiddenPosition.x / chunkSize.x,
                        hiddenPosition.y / chunkSize.y);
                    float2 chunkCenterf = ((float2)(chunkPosition.x,
                        chunkPosition.y) + (float2)(0.5f)) * chunksToHidden;
                    int2 chunkCenter = (int2)(chunkCenterf.x, chunkCenterf.y);
                    // Next layer node's receptive field
                    int2 fieldCenter = project(chunkCenter, hiddenToVisible);
                    int2 fieldLowerBound = fieldCenter - (int2)(radius);
                    int2 fieldUpperBound = fieldCenter + (int2)(radius + 1);
                    // Check for containment
                    if (inBounds(visiblePosition, fieldLowerBound,
                        fieldUpperBound)) {
                        int2 offset = visiblePosition - fieldLowerBound;
                        float hiddenState = read_imagef(hiddenStates,
                            defaultSampler, hiddenPosition).x;
                        float hiddenActivation = read_imagef(hiddenActivations,
                            defaultSampler, hiddenPosition).x;
                        int wi = s + numSamples *
                            (offset.y + offset.x * (radius * 2 + 1));
                        float weight = read_imagef(weights, defaultSampler,
                            (int4)(hiddenPosition.x, hiddenPosition.y, wi, 0)).x;
                        recon += hiddenState * hiddenActivation * weight;
                    }
                }
            }
        write_imagef(recons, (int4)(visiblePosition.x,
            visiblePosition.y, s, 0), (float4)(recon, 0.0f, 0.0f, 0.0f));
    }
}
```

Listing 7: sfcReconstruct forms a prediction from the encoder hidden states, using a linear transformation.

learn runs the learning kernel sfcLearnWeights in the Chunk Encoder. The learning mechanism operates on each chunk of hidden states, using the chunk winner as a target for each weight leading into a hidden unit. This target-following mechanism leads chunks of hidden units to behave as small self-organising maps (SOM's). The strength of the influence of the chunk winner on the hidden unit exponentially decays with the distance to the winner, and the weight is updated a little in the direction of the sampled input. The weight tensor $W_{enc}$ is indexed by i, j for the input plane, by k, l for the hidden unit plane, and by m for the $n_{sample}$ samples.

---

Procedure sfcLearnWeights(Z, $Z_{chunk}$, P, $\overline{W}_{enc}$, r, α, $n_{sample}$, γ)

Data: hidden states Z, chunk winners $Z_{chunk}$, samples P, weights $\overline{W}_{enc}$, radius r, α, # samples $n_{sample}$, γ
Result: new encoder weights W
for $w_{ijklm} \in W$ do
$\quad (k_c, l_c)_{chunk} \leftarrow$ chunkWinner($Z_{chunk}$, kl)  // chunk winner position
$\quad w_{ijklm} \leftarrow \overline{w}_{ijklm} + \alpha e^{-\gamma((k_c-k)^2+(l_c-l)^2)}(p_{ijm} - \overline{w}_{ijklm})$  // weight update

---

```
void kernel sfcLearnWeights(read_only image2d_t hiddenStates, read_only image2d_t chunkWinners,
    read_only image3d_t samples, read_only image3d_t weightsBack,
    write_only image3d_t weightsFront, int2 hiddenSize, int2 visibleSize, float2 hiddenToVisible,
    int2 chunkSize, float2 chunksToHidden, int radius,
    float weightAlpha, int numSamples, float gamma)
{
    int2 hiddenPosition = (int2)(get_global_id(0), get_global_id(1));
    int2 chunkPosition = (int2)(hiddenPosition.x / chunkSize.x,
        hiddenPosition.y / chunkSize.y);
    float2 chunkCenterf = ((float2)(chunkPosition.x, chunkPosition.y) +
        (float2)(0.5f)) * chunksToHidden;
    int2 chunkCenter = (int2)(chunkCenterf.x, chunkCenterf.y);
    int2 visiblePositionCenter = project(chunkCenter, hiddenToVisible);
    int2 fieldLowerBound = visiblePositionCenter - (int2)(radius);
    int2 chunkWinner = read_imagei(chunkWinners, defaultSampler, chunkPosition).xy;
    int2 hiddenStartPosition = chunkPosition * chunkSize;
    int2 delta = (hiddenStartPosition + chunkWinner) - hiddenPosition;
    float strength = exp(-(delta.x * delta.x + delta.y * delta.y) * gamma);
    for (int s = 0; s < numSamples; s++) {
        for (int dx = -radius; dx <= radius; dx++)
            for (int dy = -radius; dy <= radius; dy++) {
                int2 visiblePosition = visiblePositionCenter + (int2)(dx, dy);
                if (inBounds0(visiblePosition, visibleSize)) {
                    int2 offset = visiblePosition - fieldLowerBound;
                    int wi = s + numSamples * (offset.y + offset.x * (radius * 2 + 1));
                    float weightPrev = read_imagef(weightsBack, defaultSampler,
                        (int4)(hiddenPosition.x, hiddenPosition.y, wi, 0)).x;
                    float sample = read_imagef(samples, defaultSampler,
                        (int4)(visiblePosition.x, visiblePosition.y, s, 0)).x;
                    float sLearn = strength * (sample - weightPrev);
                    write_imagef(weightsFront, (int4)(hiddenPosition.x, hiddenPosition.y, wi, 0),
                        (float4)(weightPrev + weightAlpha * sLearn, 0.0f, 0.0f, 0.0f));
                }
            }
    }
}
```

Listing 8: sfcLearnWeights

```
void kernel sfcLearnBiases(read_only image2d_t hidden-
    Stimuli,
    read_only image2d_t hiddenStates, read_only image2d_t
        biasesBack,
    write_only image2d_t biasesFront, float activeRatio, float
        biasAlpha)
{
    int2 hiddenPosition=(int2)(get_global_id(0), get_glo-
        bal_id(1));
    float hiddenState=read_imagef (hiddenStates, default-
        Sampler, hiddenPosition).x;
    float hiddenStimulus=read_imagef (hiddenStimuli,
        defaultSampler, hiddenPosition).x;
    // Bias update
    float biasPrev=read_imagef (biasesBack, defaultSampler,
        hiddenPosition).x;
    write_imagef (biasesFront, hiddenPosition,
        (float4)(biasPrev+biasAlpha*(activeRatio−hidden-
            State)));
}
```

Listing 9: sfcLearnBiases

Detailed Description—Alternate STDP Process sfsLearnWeights is an alternative learning process for previous encoders as detailed earlier. The learning uses a variant of Spike Time Dependent Plasticity, as before, but in this case the delta $\Delta_{stdp}$ is (minus) the product of the previous state $\overline{z}_{kl}$ and the change in the input ($\overline{d}_{ij} - d_{ij}$).

---

Procedure sfsLearnWeights(Z, $\overline{Z}$, D, $\overline{D}$, $\overline{W}_{enc}$, r, α)

Data: hidden states Z/$\overline{Z}$, derived inputs D/$\overline{D}$, weights $\overline{W}_{enc}$, radius r, α
Result: new encoder weights W
for $w_{ijkl} \in W$ do $\quad$ scale $\leftarrow \dfrac{1}{\sqrt{\max(10^{-4}, \sum W_{kl})}}$  // sum incoming weights $\quad \Delta_{stdp} \leftarrow \overline{z}_{kl}(\overline{d}_{ij} - d_{ij})$ $\quad w_{ijkl} \leftarrow \overline{w}_{ijkl} * \text{scale} + \alpha\Delta_{stdp}$

```
void kernel sfsLearnWeights(read_only image2d_t hiddenStates,
   read_only image2d_t hiddenStatesPrev, read_only image2d_t visibleStates,
   read_only image2d_t visibleStatesPrev, read_only image3d_t weightsBack,
   write_only image3d_t weightsFront,
   int2 visibleSize, float2 hiddenToVisible, int radius, float weightAlpha)
{
   int2 hiddenPosition = (int2)(get_global_id(0), get_global_id(1));
   int2 visiblePositionCenter = project(hiddenPosition, hiddenToVisible);
   int2 fieldLowerBound = visiblePositionCenter - (int2)(radius);
   float hiddenState = read_imagef(hiddenStates, defaultSampler, hiddenPosition).x;
   float hiddenStatePrev = read_imagef(hiddenStatesPrev, defaultSampler, hiddenPosition).x;
   float weightSum = 0.0f;
   for (int dx = -radius; dx <= radius; dx++)
      for (int dy = -radius; dy <= radius; dy++) {
         int2 visiblePosition = visiblePositionCenter + (int2)(dx, dy);
         if (inBounds0(visiblePosition, visibleSize)) {
            int2 offset = visiblePosition - fieldLowerBound;
            int wi = offset.y + offset.x * (radius * 2 + 1);
            float weightPrev = read_imagef(weightsBack, defaultSampler,
               (int4)(hiddenPosition.x, hiddenPosition.y, wi, 0)).x;
            weightSum += weightPrev;
         }
      }
   float scale = 1.0f / fmax(0.0001f, weightSum);
   for (int dx = -radius; dx <= radius; dx++)
      for (int dy = -radius; dy <= radius; dy++) {
         int2 visiblePosition = visiblePositionCenter + (int2)(dx, dy);
         if (inBounds0(visiblePosition, visibleSize)) {
            int2 offset = visiblePosition - fieldLowerBound;
            int wi = offset.y + offset.x * (radius * 2 + 1);
            float weightPrev = read_imagef(weightsBack, defaultSampler,
               (int4)(hiddenPosition.x, hiddenPosition.y, wi, 0)).x;
            float visibleState =
               read_imagef(visibleStates, defaultSampler, visiblePosition).x;
            float visibleStatePrev = read_imagef(visibleStatesPrev, defaultSampler,
               visiblePosition).x;
            float learn = hiddenStatePrev * visibleStatePrev - hiddenStatePrev * visibleState;
            write_imagef(weightsFront, (int4)(hiddenPosition.x, hiddenPosition.y, wi, 0),
               (float4)(fmin(1.0f, fmax(0.0001f,
                  weightPrev * scale + weightAlpha * learn)), 0.0f, 0.0f, 0.0f));
         }
      }
}
```

Listing 10: sfsLearnWeights uses an improved STDP learning rule for the Delay Encoder.

Detailed Description—Max-Pooling Over Time fhPool performs max-pooling over time (MPoT) to slow changes passed up the hierarchy. This has the effect of allowing higher layers to learn longer-range features of the input stream and thus provide higher-level context to assist lower layers in prediction. This kernel is run at the end of the Encoder's activate step as described earlier.

```
void kernel fhPool(read_only image2d_t states, read_only
   image2d_t outputsBack,
   write_only image2d_t outputsFront, float scale) {
   int2 position=(int2)(get_global_id(0), get_global_id(1));
   float state=read_imagef(states, defaultSampler, position)
      .x;
   float outputPrev=read_imagef (outputsBack, defaultSampler, position).x;
   write_imagef (outputsFront, position,
      (float4)(fmax(outputPrev, state), 0.0f, 0.0f, 0.0f));
}
```
Listing 11: fhPool performs max-pooling over time (MPoT) to slow changes passed up the hierarchy.

Further Context of Invention

It will thus be seen that the objectives set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

Various embodiments of the invention include methods for automatically transforming raw information signals of low value and utility (which may be very high-dimensional, difficult to interpret, or of very high data rate) into information signals of far higher value to the user (such as summary scores, classifications of status, anomalous pattern reports, maintenance recommendations, medical alarms, diagnostic hypotheses, or control signals). The method involves the operation of a hierarchically structured sparse predictive network which can automatically learn a model in its memory of the temporal structure of the data, produce predictions and measure anomalies, and produce high-value information as described above.

Further embodiments of the invention include a computer program product, which include machine instructions stored in non-transitory form, and which, when loaded into memory of a computerized apparatus, cause control circuitry of the computerized apparatus to execute such machine instructions as are necessary to construct and operate the componentry described above, and which thus implement the method described above, such as the transformation of the low-value, difficult-to-interpret raw data into high-value, actionable information.

Having described certain embodiments, numerous alternative embodiments or variations can be made. For example, although embodiments have been described in connection with particular ladder networks as shown in FIGS. 3, 11 and 14, one should appreciate that these are merely examples and that the principles hereof may be applied in other structures or networks.

Also, while particular encoders are shown and described, such as delay encoders and chunk encoders, one should appreciate that these are merely examples. Other types of encoders may be used, provided they generate nonlinear encodings at their outputs that are based upon both current inputs and previous inputs.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed:

1. An apparatus for processing streams of time-varying data, the apparatus comprising:
    first through N-th processing stages, each i-th processing stage (i=1 to N) of the first through N-th processing stages including an encoder and a respective decoder,
    the encoder of each i-th processing stage having an input configured to receive, as a sequence of input values, a respective stream of time-varying data and an output configured to produce, as a sequence of encoded values, a respective encoded stream of time-varying data, each encoded value based upon both (1) a current input value of the stream of time-varying data received by that encoder and (2) a set of previous input values of the stream of time-varying data received by that encoder, the output of the encoder of each i-th processing stage except the N-th processing stage coupled to the input of the encoder of the (i+1)-th processing stage, the input of the encoder of the first processing stage providing an input of the apparatus,
    the decoder of each i-th processing stage having an input coupled to the output of the respective encoder and an output configured to provide a prediction of a next input value that will be received at the input of the respective encoder, the output of the decoder of each i-th processing stage except the first processing stage configured to provide the respective prediction as feedback to the decoder of the (i−1)-th processing stage, the output of the decoder of the first processing stage providing an output of the apparatus.

2. The apparatus of claim 1,
    wherein each of the first through N-th processing stages is coupled to a timing reference, the timing reference configured to produce a sequence of time steps,
    wherein the encoders in the first through N-th processing stages are configured to generate respective encoded values at their respective outputs in order from first through N-th during a current time step, and
    wherein the decoders in the first through N-th processing stages are configured to generate respective predictions at their respective outputs in reverse order from N-th to first during the current time step, the prediction from the decoder of the first processing stage configured to predict a next input value of the time-varying data that will be received at the input of the encoder of the first processing stage during a next time step.

3. The apparatus of claim 2, wherein each of the decoders in the first through N-th processing stages is configured to generate the respective prediction during the current time step but after the respective encoder has produced a respective encoded value of the encoded stream of time-varying data during the current time step.

4. The apparatus of claim 3, wherein the apparatus is configured to generate an output value at the output of the apparatus from an input value received at the input of the apparatus by way of a single processing path that starts at the encoder of the first processing stage and proceeds, in a single direction and without reversal, from the encoder of the first processing stage, to the encoder of the N-th processing stage, to the decoder of the Nth processing stage, and to the decoder of the first processing stage.

5. The apparatus of claim 4, wherein the apparatus is configured to produce a new output value at the output of the apparatus, based on a new input value received at the input of the apparatus, during each of multiple successive time steps by processing each new input value received at the input of the apparatus via the single processing path to generate the respective output value of the apparatus, each new output value produced at the output of the apparatus during each time step providing a prediction of a new input value that will be received at the input of the apparatus during a respective next time step.

6. The apparatus of claim 3, wherein each i-th processing stage includes multiple weights and is configured to adjust at least some of its weights in response to detecting differences between (i) the output of the decoder in the i-th processing stage during the current time step and (ii) an input to the encoder in the i-th processing stage during a previous time step.

7. The apparatus of claim 2, wherein each encoder in a set of the processing stages includes:
    a feedforward unit configured to generate a stimulus vector from the respective stream of time-varying data received at the input of the encoder;
    an activation updater configured to generate an activation vector by updating activations using the stimulus vector;

a non-linear selector configured to produce a set of sparse activations by selecting a subset of elements from the activation vector; and a state updater configured to produce, based on the set of sparse activations, the respective encoded stream of time-varying data at the output of the encoder.

8. The apparatus of claim 7, wherein the nonlinear selector in the encoder of at least one of the set of processing stages is further configured to render the activation vector as a set of chunks, and wherein that nonlinear selector is further configured to select the subset of elements by selecting only a single element from each of the set of chunks.

9. The apparatus of claim 7, wherein each encoder is configured to provide at its output a signal in which each element that is not based on one of the selected subset of elements is represented as a zero.

10. The apparatus of claim 9, wherein each encoder is further configured to provide a one in the signal at its output for each element that is based on one of the selected subset of elements.

11. The apparatus of claim 7, wherein the feedforward unit of the respective encoder is configured to manage multiple feedforward weights, and wherein the respective encoder is configured to update at least one of the feedforward weights in response to a detection of a difference between (1) the output of the respective decoder during previous time step which predicts an input to the encoder during the current time step and (2) an input to the encoder during a previous time step.

12. The apparatus of claim 2,
wherein the N-th processing stage is configured to generate new outputs of its encoder at a first frequency,
wherein the first processing stage is configured to generate new outputs of its encoder at a second frequency, and
wherein the first frequency is less than the second frequency.

13. The apparatus of claim 12, wherein at least one i-th processing stage except for the first is configured to generate new outputs of its encoder at a lower frequency than that of the respective (i−1)-th processing stage.

14. The apparatus of claim 13, wherein one or more of the first through N-th processing stages further includes a respective predictor coupled in series between the output of the respective encoder and the input of the respective decoder, the predictor of each i-th processing stage of the one or more processing stages also coupled in series between the output of the decoder in the (i+1)-th processing stage and the decoder of the i-th processing stage and configured to provide a corrective supplementation of the output of the respective encoder using feedback.

15. The apparatus of claim 2,
wherein a first particular one of the first through N-th processing stages is disposed at a first physical location,
wherein a second particular one of the first through N-th processing stages is disposed at a second physical location, and
wherein the first and second particular ones of the first through N-th processing stages are connected to each other over a computer network.

16. The apparatus of claim 2, wherein output from any of the first through N-th processing stages is coupled to other electronic circuitry to affect operation of the other electronic circuitry.

17. A method for processing streams of time-varying data, the method comprising:

providing first through N-th processing stages, each ith processing stage (i=1 to N) of the first through N-th processing stages including an encoder and a respective decoder;

by the encoder in each i-th processing stage,
receiving, by an input of the encoder, a respective stream of time-varying data as a sequence of input values, and
providing, by an output of the encoder, a respective encoded stream of time-varying data as a sequence of encoded values, the encoder generating each encoded value based upon both (1) a current input value of the stream of time-varying data received by that encoder and (2) a set of previous input values of the stream of time-varying data received by that encoder, the encoder of each i-th processing stage except the N-th processing stage providing its encoded values to the encoder of the (i+1)-th processor stage, the input of the encoder of the first processing stage receiving an overall processing input;

by the decoder of each i-th processing stage,
receiving, by an input of the decoder, the sequence of encoded values generated by the respective encoder; and
generating, by the decoder, a sequence of predictions of each next input value that will be received by the input of the respective encoder, the decoder of each i-th processing stage except the first processing stage providing the respective predictions as feedback to the decoder of the (i−1)-th processing stage, the decoder of the first processing stage providing an overall processing output.

18. The method of claim 17, further comprising:
generating, by a timing reference, a sequence of time steps; and
providing the sequence of time steps to each of the first through N-th processing stages,
wherein generating the encoded value by each of the encoders in the first through N-th processing stages is performed in order from first through N-th processing stages during a current time step, and
wherein generating a prediction by each of the decoders in the first through N-th processing stages is performed in reverse order from N-th to first during the current time step, the prediction from the decoder of the first processing stage configured to predict a next input value of the time-varying data that will be received at the input of the encoder of the first processing stage during a next time step.

19. The method of claim 18, wherein generating the respective prediction by each of the decoders in the first through N-th processing stages is performed during the current time step but after the respective encoder has generated a respective encoded value during the current time step.

20. The method of claim 19, further comprising generating an output value at the overall processing output from an input value received at the overall processing input by way of a single processing path that starts at the encoder of the first processing stage and proceeds, in a single direction and without reversal, to the encoder of the N-th processing stage, to the decoder of the Nth processing stage, and to the decoder of the first processing stage.

21. The method of claim 20, further comprising producing a new output value at the overall processing output, based on a new input value received at the overall processing input, during each of multiple successive time steps by processing each new input value received at the overall processing input via the single processing path to generate the respective new output value at the overall processing output, each new output value produced at the overall processing output during each time step providing a prediction of a new input value that will be received at the overall processing input during a respective next time step.

22. A computer program product including a set of non-transitory, computer-readable media having instructions which, when executed by control circuitry of a computerized apparatus, cause the control circuitry to perform a method for processing streams of time-varying data, the method comprising:
providing first through N-th processing stages, each ith processing stage (i=1 to N) of the first through N-th processing stages including an encoder and a respective decoder;
by the encoder in each i-th processing stage,
receiving, by an input of the encoder, a respective stream of time-varying data as a sequence of input values, and
providing, by an output of the encoder, a respective encoded stream of time-varying data as a sequence of encoded values, the encoder generating each encoded value based upon both (1) a current input value of the stream of time-varying data received by that encoder and (2) a set of previous input values of the stream of time-varying data received by that encoder, the encoder of each i-th processing stage except the N-th processing stage providing its encoded values to the encoder of the (i+1)-th processor stage, the input of the encoder of the first processing stage receiving an overall processing input;
by the decoder of each i-th processing stage,
receiving, by an input of the decoder, the sequence of encoded values generated by the respective encoder; and
generating, by the decoder, a sequence of predictions of each next input value that will be received by the input of the respective encoder, the decoder of each i-th processing stage except the first processing stage providing the respective prediction as feedback to the decoder of the (i−1)-th processing stage, the decoder of the first processing stage providing an overall processing output.

23. The computer program product of claim 22, wherein each i-th processing stage includes multiple weights, and wherein the method further comprises the i-th processing stage adjusting at least some of its weights in response to detecting a difference between (i) a current prediction of the decoder in the i-th processing stage and (ii) a previous input value to the encoder in the i-th processing stage.

24. The computer program product of claim 22, wherein the method further comprises, by the encoder in at least one of the processing stages:
generating a stimulus vector from the respective stream of time-varying data received at the input of the encoder;
generating an activation vector by updating activations using the stimulus vector;
producing a set of sparse activations by selecting a subset of elements from the activation vector; and
producing, based on the set of sparse activations, the respective encoded stream of time-varying data at the output of the encoder.

25. The computer program product of claim 24, wherein the method further comprises:
rendering the activation vector as a set of chunks, and
selecting, as the subset of elements, only a single element from each of the set of chunks.

26. The computer program product of claim 24, wherein the method further comprises the encoder outputting a signal in which each element that is not based on one of the selected subset of elements is represented as a zero.

27. The computer program product of claim 26, wherein the method further comprises the encoder outputting a one in the signal for each element that is based on one of the selected subset of elements.

28. The computer program product of claim 24, wherein the method further comprises:
managing, by the encoder, multiple feedforward weights; and
updating at least one of the feedforward weights in response to detecting of a difference between a current input of the encoder and a previous output of the respective decoder which predicted that current input.

29. The computer program product of claim 22, wherein the method further comprises:
generating, by the N-th processing stage, new outputs of its encoder at a first frequency; and
generating, by the first processing stage, new outputs of its encoder at a second frequency,
wherein the first frequency is less than the second frequency.

30. The computer program product of claim 2, wherein the method further comprises generating, by at least one i-th processing stage (i=2 to N), new outputs of its respective encoder at a lower frequency than that of the (i−1)-th processing stage.

31. The computer program product of claim 30, wherein one or more of the first through N-th processing stages further includes a respective predictor coupled in series between the output of the respective encoder and the input of the respective decoder, the predictor of each i-th processing stage of the one or more processing stages also coupled in series between the output of the decoder in the (i+1)-th processing stage and the decoder of the i-th processing stage, wherein the method further comprises the predictor of each i-th processing stage providing a corrective supplementation of the output of the respective encoder using feedback.

32. The computer program product of claim 22, wherein each i-th processing stage includes multiple weights and wherein the method further comprises receiving no initial values of the weights in each i-th processing stage prior to operating the multiple processing stages.

33. The computer program product of claim 22, wherein each i-th processing stage includes multiple weights and wherein the method further comprises establishing predetermined initial values of the weights in each i-th processing stage prior to operating the multiple processing stages.

* * * * *